US008781989B2

(12) United States Patent
Duchon

(10) Patent No.: US 8,781,989 B2
(45) Date of Patent: Jul. 15, 2014

(54) METHOD AND SYSTEM TO PREDICT A DATA VALUE

(75) Inventor: Andrew P. Duchon, Newton, MA (US)

(73) Assignee: Aptima, Inc., Woburn, MA (US)

( * ) Notice: Subject to any disclaimer, the term of this patent is extended or adjusted under 35 U.S.C. 154(b) by 632 days.

(21) Appl. No.: 12/987,147

(22) Filed: Jan. 9, 2011

(65) Prior Publication Data

US 2011/0106743 A1    May 5, 2011

Related U.S. Application Data

(63) Continuation-in-part of application No. 12/812,250, filed as application No. PCT/US2009/030876 on Jan. 13, 2009.

(60) Provisional application No. 61/021,028, filed on Jan. 14, 2008, provisional application No. 61/311,897, filed on Mar. 9, 2010.

(51) Int. Cl.
*G06F 9/44* (2006.01)
*G06N 7/02* (2006.01)
*G06N 7/06* (2006.01)

(52) U.S. Cl.
USPC .................................. 706/52; 707/6; 707/102

(58) Field of Classification Search
None
See application file for complete search history.

(56) References Cited

U.S. PATENT DOCUMENTS

| | | | |
|---|---|---|---|
| 7,577,654 B2 * | 8/2009 | Brants et al. | 1/1 |
| 7,822,750 B2 * | 10/2010 | Duchon et al. | 707/738 |
| 2003/0135445 A1 * | 7/2003 | Herz et al. | 705/37 |
| 2008/0005137 A1 * | 1/2008 | Surendran et al. | 707/101 |

OTHER PUBLICATIONS

Sentiment Analyzer: Extracting Sentiments about a Given Topic using Natural Language Processing Techniques; Jeonghee Yi et al; IBM; Proceedings of the Third IEEE International Conference on Data Mining (ICDM'03) 0-7695-1978-4/03 $ 17.00 © 2003 IEEE.*
Joshi, Mahesh; Das Dipanjan; Gimpel, Kevin; Smith, Noah A.; Movie Reviews and Revenues: An Experiment in Text Regression, Human Language Technologies: The 2010 Annual Conference of the North American Chapter of the ACL, pp. 293-296, Los Angeles, California, Jun. 2010.
Bollen, Johan; Pepe, Alberto; Mao, Huina; Modeling public mood and emotion: Twitter sentiment and socio-economic phenomena. arXiv:0911.1583 (Nov. 2009).
Sparks, Wilbert L., Non-Final Office Action for parent patent application, U.S. Appl. No. 12/812,250, mailed May 7, 2014, 26 pages, USA.

(Continued)

*Primary Examiner* — Kakali Chaki
*Assistant Examiner* — Luis Sitiriche
(74) *Attorney, Agent, or Firm* — John J Brooks, III

(57) ABSTRACT

Embodiments of the present invention include methods and systems for predicting the likelihood of topics appearing in a set of data such as text. A number of latent variable methods are used to convert the data into a set of topics, topic values and topic profiles. A number of time-course methods are used to model how topic values change given previous topic profiles, or to find historical times with similar topic values and then projecting the topic profile forward from that historical time to predict the likelihood of the topics appearing. Embodiments include utilizing focus topics, such as valence topics, and data representing financial measures to predict the likelihood of topics. Methods and systems for modeling data and predicting the likelihood of topics over other dimensions are also contemplated.

31 Claims, 15 Drawing Sheets

(56) References Cited

OTHER PUBLICATIONS

Hofmann, Thomas, Latent Semantic Models for Collaborative Filtering, ACM Transactions of Information Systems, vol. 22, No. 1, Jan. 2004, 27 pages, pp. 89-115, USA.

Chung, Ching-Fan and Baillie, Richard T., Small Sample Bias in Conditional Sum-of-Squares Estimators of Fractionally Integrated ARMA Models, J. M. Dufour et al. (eds), New Development in Time Series Econometrics, Physica-Verlag Heidelberg, 1994, 16 pages, pp. 235-250.

* cited by examiner

METHOD AND SYSTEM TO PREDICT A DATA VALUE

CROSS-REFERENCE TO RELATED APPLICATIONS

This U.S. patent application is a Continuation-In-Part of co-pending U.S. patent application Ser. No. 12/812,250 entitled "METHOD AND SYSTEM TO PREDICT THE LIKELIHOOD OF TOPICS" and filed on 9 Jul. 2010 as a U.S. National Stage Application of PCT Application No. PCT/US2009/030876 filed on 13 Jan. 2009 and the entire contents of which are herein incorporated by reference in their entirety. As a Continuation-In-Part of U.S. patent application Ser. No. 12/812,250 this application also claims benefit of PCT Application No. PCT/US2009/030876 filed on 13 Jan. 2009 and U.S. Provisional Patent Application No. 61/021,028 filed on 14 Jan. 2008 and entitled "METHOD AND SYSTEM TO PREDICT THE LIKELIHOOD OF FUTURE TOPICS" both of which are herein incorporated by reference in their entirety. This U.S. patent application also claims benefit to U.S. Provisional Application No. 61/311,897 entitled "METHOD AND SYSTEM TO PREDICT THE LIKELIHOOD OF TOPICS" filed on 9 Mar. 2010 the entire contents of which are herein incorporated by reference in its entirety.

STATEMENT REGARDING FEDERALLY SPONSORED RESEARCH OR DEVELOPMENT

This invention was made with Government support under Contract #N00014-08-C-0188 and awarded by the Office of Naval Research. The Government has certain rights in the invention.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates in general to a method and system to predict the likelihood of data topics that may occur from data sources. The likelihood of the data topics may be predicted over a dimension of time or over other dimensions.

Anyone would like to have a crystal ball: to know what to expect, to know what will happen and take advantage of that information. Of course, this is impossible, especially when human beings are involved. However, some reliable probabilities may be true of human behavior, especially at the group level. A number of companies and researchers listed below have taken a computational social science view by creating templates of behaviors, fitting human group activities seen on the ground into those behaviors, and determining the frequencies with which one kind of behavior follows another.

When taken from the news, these data are often called "event data" and techniques of "sparse parsing" (e.g. U.S. Pat. No. 6,539,348 to Douglas G. Bond et. al.; King, G. & Lowe, W. (2003), "An automated information extraction tool for international conflict data with performance as good as human coders: A rare events evaluation design." International Organization, 57, 617-642; and Schrodt, P. A. (2000), "Forecasting conflict in the Balkans using Hidden Markov Models." paper presented at the American Political Science Association, Washington, D.C., found at the time of this application at http://web.ku.edu/keds/papers.dir/KEDS.APSA00.pdf) are often used to extract data from the headlines or the body of news articles. The data extracted are usually in terms of an event such that actor1 performed some action on actor2. The actors are defined in a dictionary, as well as the set of possible actions that can be performed. These dictionaries must also contain the variety of words and word strings used to express the presence of an actor (e.g., "Israel", "Rabin" and "Tel Aviv" would all map to the actor called "Israeli Government") or the occasion of an event (e.g., thousands of verbs are matched to about 100 types of events—as illustrated at the time of this application at http://web.ku.edu/keds/data.dir/KEDS.WEIS.Codes.html). Once these event data have been captured, techniques can be used to determine what sequences of events tend to precede crises versus non-crises (Schrodt, 2000 and Bond et al.).

Related word-based methods for predicting behavior include 1) looking for specific keywords to detect a mood or sentiment in large-scale micro-blogging sources and relating counts of these words to socio-economic data (as illustrated by Bollen, J., Pepe, A., and Mao, H. (2010) Modeling public mood and emotion: Twitter sentiment and socio-economic phenomena, WWW2010, Raleigh, N.C.), and 2) counting all words and other features of a movie review to predict the revenue from the opening week of a movie (as illustrated by Joshi, M., Das, D., Gimpel, K., and Smith, N. A. (2010) Movie Reviews and Revenues: An Experiment in Text Regression. *Human Language Technologies: The 2010 Annual Conference of the North American Chapter of the ACL*, pages 293-296, Los Angeles, Calif.). The first method biases the categories (i.e., the moods) to be of a pre-defined nature. The second method provides no further understanding of the results since individual features are used independently to make a prediction.

Another method of predicting future behavior at a large scale is to use agent-based modeling (e.g., as illustrated at the time of this application at http://blog.wired.com/defense/2007/11/lockheed-peers-.html). This work attempts to model a population as a discrete set of agents, each with their own internal dynamics using data collected from the field and socio-cultural models.

One problem with both kinds of analysis is that human behavior is much more complex and dynamic than they can accommodate. These analyses tend to require large amounts of manual labor (e.g., interviewing many people in a population) or are biased and limited by what the theoretician's model can accommodate in the textual analysis. They are also both developed specifically for a given population and so may be inappropriate for another. What is needed is a method for analyzing all forms of human behavior, without theoretical constraints or biases, to determine the relationships between one behavior and another in a culturally relevant manner.

Situations exist in the art today in which users attempting to predict future events have access to a large corpus of open source documents (such as newspapers, blogs, or the like) covering an extended time period (months to years). In this situation, a user concerned with non-tactical decision-making may need to address questions of why things happened and what will happen (or, more precisely, what is likely to happen), in addition to questions of what happened and who's who. For example, consider elections in Nigeria. A user might be asked to identify the key political parties in Nigeria and the key players; to summarize what happened in the elections since Nigerian independence; to provide an assessment of why those things happened (e.g., why rioting followed one election, why another was postponed, etc.), or what is likely to happen following the election of April 2007.

A user today might solve such problems by using a system like the Open Source Center (as illustrated at the time of this application at www.opensource.gov) which provides reports and translations from thousands of publications, television and radio stations, and Internet sources around the world covering many years. Current news data archives like the Open Source Center, or any number of other news data aggregators and suppliers, support keyword search, so the user could conduct a variety of searches and retrieve (perhaps very many) articles concerning elections in Nigeria or Africa more broadly. These articles would be rank-ordered in some way, for example by recency, the number of mentions of the search string, popularity or link analysis, but generally not reflecting the user's special requirements.

Given the list of articles, the user might then have to conduct various searches to narrow down the articles to those of interest; if, for example, he or she was concerned about the possibilities of violence associated with elections, searches might need to include "violence," "riots," "killings," "voter intimidation," and other related terms. Then, those articles would have to be reviewed in temporal order to extract meaningful information, since the user is not merely seeking to compile a list of interesting anecdotes.

This is how users perform information retrieval in numerous parts of the government and military, ranging from human intelligence (HUMINT) reports in a Marine Corps Intelligence Battalion, to newspapers in the Virtual Information Center of the Asia-Pacific Area Network, to TV show transcripts that PSYOP analysts use to understand the attitudes and beliefs of a population and influence them. Nevertheless, this process has several obvious drawbacks: it can take a great deal of time, since iterative searching is typically required; it can be quite inaccurate, with problems in both precision (that is, returning too many irrelevant documents; i.e., false alarms) and recall (that is, failing to find enough relevant documents; i.e., misses), since virtuoso keywording skills may be necessary; and it does not help the user detect the kinds of patterns that could be of interest, since it has no temporal pattern-detecting ability to get at the real issue, which is, e.g., what is likely to happen after a flawed election in Nigeria?

These three methods for determining likely future events (word counting, agent-based systems, and user-intensive searching and understanding) may also be used to determine the financial direction of an individual company, a market sector, or of the economy of a country or world as a whole as measured by any number of economic indicators such as stock prices, employment, or gross domestic product (GDP). In these economic cases, textual data concerning the company, market sector, or nation might be searched or analyzed by human or machines to produce forecasts of future market behavior.

These three methods for determining likely future events (word counting, agent-based systems, and user-intensive searching and understanding), whether those events are political, military, or economic, each have their own deficiencies as described above. Embodiments of the disclosed invention address many of these drawbacks and provide additional novel improvements to the art.

BRIEF SUMMARY OF THE INVENTION

Embodiments of the present invention uniquely recognize that with a conversion of data and activities into topics, and modeling these topics using time-course methods, the resulting topic models can be combined with temporal prediction methods to objectively predict topic activities at other times, including topic activities in the future; as well as to objectively predict the activity of economic indicators at other times, including activities in the future.

Embodiments of the present invention include methods and systems for predicting the likelihood of topics appearing in a stream of text, e.g., news published in a newspaper or on the Internet, thereby attributing meaning to current events in terms of the likely consequences of such events. Any of a number of latent variable methods is used to convert a timespan of text, e.g., the news from a day or week, into a set of topic activity levels. Any of a number of predictive modeling techniques can be used to model how topic activity levels change given previous activity levels, or to find days in history with similar topic profiles and looking forward from those historical days. Using predictive models, the activity levels of any, or of user-chosen, topics can be predicted given the current, or recent, topic activity levels, or a subset of such topics. Additional systems and methods are described for manipulating the topic activities that are used to make the prediction (e.g., reducing the influence of topics known by the user to be irrelevant); and, for manipulating the probabilities and importance ratings of topics that are predicted (e.g., a user reducing the likelihood of a system-based prediction because of extra information the user has); and, collaborating about such predictions and importance (e.g., providing reasons for a change in predicted value such that others can discuss the rationale and provide their own value which is combined with other user values as well as the computed value). Any of a number of exogenous variables can also be included in the model for both input and predicted output, including economic indicators such as stock market prices, inflation rates, etc.

Embodiments are also disclosed for manipulating and creating topic profiles based on words, articles, or days of text; searching historical records in the text stream (or subsets thereof) with similar topic profiles to help a user understand the circumstances that have led to such topics being active; changing the time window of both searching, modeling and predicting (e.g., taking into account the last week's worth of news, instead of one day's worth, or predicting the topic profile for the next week, not just a single days three days from now); ranking standard search results based on relevance to past, current, or future topic activities (e.g., ranking search results for "bomb" based on relevance to topics that occurred after today's topic profile); and, setting "alerts" that would warn a user that 1) the likelihood of an future topic has increased above a threshold, or 2) a topic has occurred that was not predicted and is therefore likely to lead to further unpredictable events.

It is an object of one embodiment of the present invention to provide a computer based system for predicting a data value comprising a processor capable of executing machine instructions and the machine instructions including a means for predicting a predicted data value of a first data set at a predicted dimension value utilizing a focus topic profile.

It is another object of one embodiment of the present invention to provide a computer based system for predicting a data value comprising a processor capable of executing machine instructions on a first set of data comprising financial data and the machine instructions including a means for predicting a predicted data value of the first data set at a predicted dimension value utilizing a focus topic profile. In some embodiments, the financial data comprises a function of a Dow Jones Industrial Average. In some embodiment, the focus topic profile comprises a focus topic profile of news data.

It is yet another object of one embodiment of the present invention to provide a computer based system for predicting a data value comprising a processor capable of executing machine instructions on a first set of data comprising financial data, the machine instructions including means for transforming a second set of data over at least one dimension value to create a topic profile and a means for predicting a predicted value of the first set of data at a predicted dimension value. In some embodiments, the financial data comprises a function of a Dow Jones Industrial Average, In some embodiments, the system further comprises a means for analyzing a second set of data using a latent variable method using at least one focus topic and the focus topic profile comprises at least one focus topic value of the at least one focus topic from the second set of data. In some embodiments, the computer based system further comprises a means for analyzing a second set of data using a latent variable method, the latent variable method using at least one focus feature from a third data set to create at least one focus topic from the second data set and the focus topic profile comprises at least one focus topic value of the at least one focus topic from the second set of data.

In some embodiments, the focus topic is a valence topic. In some embodiments, the means for predicting the predicted data value comprises using a predictive model of the temporal relationship of the focus topic profile and the first data set and the means for predicting the predicted data value comprises using an time series analysis model of the temporal relationship of the focus topic profile and the first data set.

In some embodiments, the means for predicting the predicted data value further comprises a modeling controller component capable of receiving a base dimension value having a base focus topic value, receiving a predicted dimension value having a difference dimension value from the base dimension value, analyzing the focus topic profile over at least one dimension value to identify a most similar focus topic value to the base focus topic value, the dimension value at the most similar focus topic value being a selected dimension value and selecting at least one focus topic value from the focus topic profile at a difference dimension value from the selected dimension value as the predicted data value at the predicted dimension value.

It is also an object of one embodiment of the present invention to provide a method for predicting a data value comprising receiving a first data set and predicting a predicted data value of the first data set at a predicted dimension value utilizing a focus topic profile. In some embodiments, the method further comprises analyzing a second data set using a latent variable method using at least one focus topic and the focus topic profile comprises at least one focus topic value of the at least one focus topic from the second set of data. In some embodiments, the method further comprises analyzing a second set of data using a latent variable method, the latent variable method using at least one focus feature from a third data set to create at least one focus topic from the second data set and the focus topic profile comprises at least one focus topic value of the at least one focus topic from the second set of data. In some embodiments, the focus topic is a valence topic.

DESCRIPTION OF THE INVENTION

Figure 1:
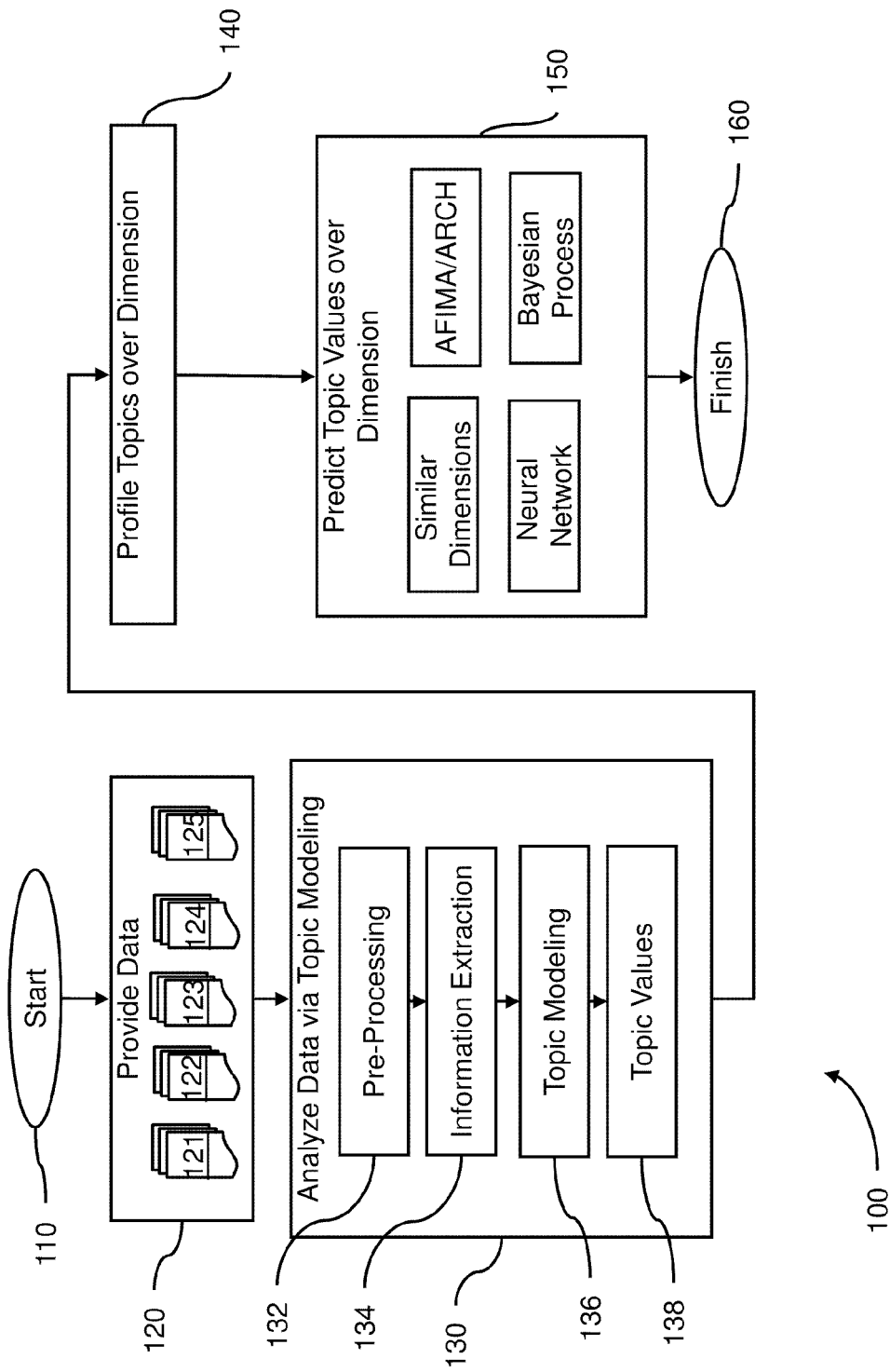
FIG. 1 is a flow chart diagram of a method for predicting the likelihood of topics in accordance with one embodiment of the present invention.

The present invention is illustrated by, but by no means limited to, the following description of a preferred embodiment.

As used throughout this description, topic means a defining characteristic, usually represented as a data element such as a word, of a single feature, activity, subject, behavior, attitude, event or an aggregation of such defining characteristics, each of which may or may not have an associated numerical value. A topic can be a conditional probability of the topic over a set of defining characteristics. As described in detail for some embodiments utilizing words of text as topics, a typical source of topics would be words in articles in a newspaper, though other sources of "text streams" could be used, such as blogs, press releases, intelligence reports, Internet forums, or any other source of text that changes or is updated over time.

As used throughout this description, a topic value (z) is a data value representing a conditional probability of the topic over a set of topics, and in one embodiment, the set of topics is words (w) such that $P(z|w)$.

As used throughout this description, a topic profile is a set of one or more topic values which may or may not be ordered. For example and not for limitation, a topic profile can include numerical representations of one or more topics or topic values. In some embodiments, a topic profile may include vectors as numerical representations.

As used throughout this description, a "focus topic" is a specialized topic. A focus topic may be predetermined and may or may not be created using a latent variable method on a separate set of data which is used to focus the set of topics. Examples of focus topics include, but are not limited to "valence topics," or "sentiment topics". As with other topics, a focus topic can be used to define a focus topic value and a focus topic profile.

As used throughout this description, a valence topic is an example of a specialized focus topic derived from a particular subset of the data. Valence topics, as an example and not for limitation, are derived from adjectives which have positive or negative connotation, such as "good" and "bad", "excellent" and "terrible". Such adjectives are often removed from normal topic modeling during the preprocessing step, or have very little weight at the end of the topic modeling step. By creating topic models based on independent sets of data (for example, but not for limitation, one model made from nouns, and another made from adjectives), different types of topic profiles may be created with different predictive capabilities. As with other types of topics, valence topics can be used to create a valence topic profile.

As used throughout this description, the term "computer-readable medium" encompasses distribution media, intermediate storage media, execution memory of a computer, and any other medium or device capable of storing for later reading by a computer a computer program implementing the methods of this invention.

In general, embodiments of the invention take a data-driven approach to analyzing data with certain topics, combined with a process for focusing expert knowledge. Instead of pre-supposing the space of topics that might have an effect on the topics of interest (e.g., bombings), descriptions of topics are transformed and quantified. The relations between future topics of interest and other topics can thereby be determined.

This method for predicting topics in a set of data elements uses unbiased statistical methods analyzing received behaviors, preferably all behaviors, as opposed to biased models of socio-dynamics based on pre-selection of the data that are applicable. These statistical methods in general can be used to find patterns that humans cannot discern; yet present those patterns in a form that humans can understand.

Although one embodiment of the invention utilizes words as a topic, it is understood that other data items can be used as topics. For example, physical events can be an appropriate topic. These physical events, or physical representations of physical phenomena, can be transformed into data elements to comprise a topic. The data element can be a numeric representation of the event, a graphic representation of the event or the event can be transformed into a word representation. The same transformation of physical or other subject matter can be made for other behaviors such as but not limited to newspapers, streaming text, audio signals, text messages, chemical reactions, videos, pictures and other data sources.

The level of activity of a topic is defined as the probability of the topic. A latent variable method, such as latent semantic analysis (LSA), probabilistic latent semantic analysis (PLSA), or latent Dirichlet allocation (LDA), can be used to determine the topics present in a corpus of text relevant to the population whose behaviors one would like to predict (though potentially all available text could be used). These latent variable methods typically require a word by document matrix as input for computation. In one embodiment, the documents would be individual articles, though other embodiments could use collections of articles, e.g., from a day or week's worth of articles from the source or multiple sources. While in one embodiment these methods may work on word by document matrices, other embodiments may use more generally object by feature matrices where objects may, for example, be images, and features are, for example, those elements of the images extracted using any of a number of visual pre-processing techniques.

Suitable examples of LSA methods that can be used in one embodiment of this invention is described in U.S. Pat. No. 5,828,999, entitled "A Method and System for Deriving a Large-Span Semantic Language Model for Large-Vocabulary Recognition Systems", filed 6 May, 1996, by Jerome R. Bellegarda et al., and U.S. Pat. No. 6,847,966, entitled "Method and System for Optimally Searching a Document Database Using a Representative Semantic Space", filed 24 Apr. 2004, by Matthew S. Sommer et al, both of which are herein incorporated by reference in their entirety. One suitable example of a PLSA embodiment that can be used in one embodiment of this invention is described in U.S. Pat. No. 6,687,696, entitled "System and Method for Personalized Search, Information Filtering, and for Generating Recommendations Utilizing Statistical Latent Class Models", filed 26 Jul. 2001 by Thomas Hofmann et al which is herein incorporated by reference in its entirety. One suitable example of and LDA embodiment that can be used in one embodiment of this invention is described in Latent Dirichlet Allocation (LDA), as described by Blei et al. in "Latent Dirichlet Allocation", Journal of Machine Learning Research 3 (2003) 993-1022 and U.S. Patent App. Pub. No. 20070203996, "Method and Apparatus for Knowledge Generation and Deployment in a Distributed Network", filed 6 Feb. 2007 by Jeffrey Davitz et al, which is herein incorporated by reference in its entirety.

With the ability to quantify levels of activity of a topic, it is possible to plot these levels as topic values against a dimension such as, but not limited to, time. For example, by plotting a level of activity against time, a timescale profile of that activity can be created and manipulated based on the time span of text that is used. For example, all the articles from a newspaper on a given day could be used to indicate the level of activity of each behavior (i.e., the probability of each topic) for that day. Every day of historical record could then be characterized as to the probability of each topic; that is, every behavior would have an activity level associated with it for every day of historical record. Clearly other time scales could analyzed, such as a week's worth of news, or an hour's. The level of activity of all the topics within one unit of time, or any other dimension, will be called a topic profile.

Given a historical record of behavior levels, numerous methods could be used to model the changes of behavior over a dimension such as time. One such method would be to look for similar behaviors at other points along the dimension in order to determine what behaviors tended to appear before or after those other similar behaviors. With this method, we would, for example, take a particular base dimension value such as a test day, find and select the N days having the most similar topic profile previous to that day in the past as a base topic profile or a base topic value, and for each of these selected dimensions (N most similar days), look at the topic values at a particular difference dimension of days, say 10 days later, then make the prediction that the topics 10 days after the test day to be a weighted average, or other such combination, of the topics 10 days from the selected historical days. If this test day is the current-time date, the predicted topic values represent the topic values predicted for a future date. 10 days represents one example of a difference dimension value between the base value of a dimension and the predicted dimension value.

In one embodiment, similarity is determined by any of a number of methods which utilize the topic profile produced for the dimensions. Such similarity methods include, but are not limited to, treating the topic profiles as vectors and using the cosine of the angle between the vectors as similarity, or using the inverse of the Euclidian distance, or more generally the Minkowski distance, between the two points in space as the similarity.

Other similarity and inverse distance metrics might also be used such as comparing the distribution of topic probabilities of the two topic profiles at the two time periods using Kullback—Leibler divergence. The Kullback-Leibler divergence is one of a class of measures call f-divergences. The formula for the Kullback-Leibler divergence, where P represents the current topic profile and Q represents the historical topic profile, both of which are composed of T topics is:

$$D_{KL}(P \mid Q) = \sum_{i=1}^{T} P(i) \log \frac{P(i)}{Q(i)}$$

Predicted values or changes in values can also be determined by many different predictive modeling techniques, including parametric and non-parametric techniques known to those in the art. Parametric techniques may include but are not limited by techniques such as multiple linear regression or discriminant analysis. Non-parametric techniques may include but are not limited to decision trees and neural networks.

Another method of predicting values or changes in values over dimensions would be to use one of a number of time series analysis techniques. Vector autoregression (VAR) and related models are generally subsumed under the rubric of (vector) autoregressive fractionally integrated moving average (AFIMA) models. VAR models are typically used in econometrics to capture the evolution and interdependencies of multiple time series. VAR models are one example of a broader class of autoregressive moving average (ARMA) models which are in turn one example of more general autoregressive integrated moving average (ARIMA) models, which can be further generalized into autoregressive fractionally integrated moving average (AFIMA) models. In VAR, a weighted sum of the previous time unit's activities is used to make a prediction:

$$x_t = a + \sum_{i=1}^{p} \Phi_i x_{t-i} + \varepsilon_t$$

where $x_t$ is the topic profile for a given time unit, a is a constant vector, p is the total number of previous time units' topic profiles we will use, $\Phi_i$ is the covariance matrix relating activity i time units back to the activity of the current time unit t, and $\varepsilon_t$ is Gaussian noise with zero mean.

More complex, non-linear models from econometrics such autoregressive conditional heteroskedasticity (ARCH) models could be used in addition to neural network models such as recurrent neural networks and time-delay neural networks, or statistical models such as Gaussian process dynamical models, or other such time series analysis techniques known to those in the art.

Other temporal prediction methods are also possible. For example, one might define a list of dates on which particular events happened, e.g., every day that a suicide bombing occurred in Israel. The topic profiles from the 10 days previous to this event could be obtained, and then hidden Markov models (HMMs) trained to discriminate sequences of topic profiles that occur before suicide bombing from those sequences that do not. Such techniques have been applied to the discrete event data (Schrodt, 2000), but not to topic models. Even more flexibly however, a topic discovered in the data might closely correspond to such an event. In this case, one would look for a topic that best captures the concept of "suicide bombing". Then, looking historically for high activity in this topic, one might also find days in which arrests were made before a bombing, or bomb-making materials were discovered, or other related matters reported in the news. Then, the degree to which the topic of suicide bombing is active, is the degree to which the model should be trained to match such a day.

It is understood that although dimensions such as time are accommodated by these methods, the methods are just as applicable to data sets having other types of relationships along other dimensions. It is also understood that although predictions of topic values and changes in topic values have been discussed above, values or changes in values of other types, such as economic indicators, could also be predicted using one of the predictive models discussed above.

Given these opportunities created through the unique combination of data, semantic analysis and time analysis techniques, the following methods and systems to predict the likelihood of topics are possible.

One Embodiment of the Method

One embodiment of the method of this invention is shown in FIG. 1 as 100. For illustration purposes and not for limitation, this embodiment utilizes textual data from new sources over the dimension of time. Other embodiments as would be obvious to those skilled in the art are also contemplated.

After the start 110 of the method, data is provided 120, received or otherwise made available to the system. In this embodiment, the data comprises a stream of text that is transformed from one or more individual documents 121-125 comprising articles (or smaller or larger subsections of the text) from a group of days. This stream of text is then analyzed 130 as a whole. As part of the analysis of step 130, the documents can be first pre-processed 132 using standard text processing which may or may not include any of the following: changing case, tokenization, stemming words (e.g., Porter stemming, or simple depluralization), extracting collocations (strings of words that "hang" together), removing punctuation, substituting variable phrases (e.g., changing all number sequences to the word "_NUMBER_"), performing information extraction 134 (e.g., identifying entities, activities, and relations explicitly), or extracting any other metadata about the source, such as author, location, newswire, etc.

The resultant words and other features (collocations, extracted information, and metadata) are then used as input for the latent variable method 136. Any latent variable method could be used, including but not limited to singular value decomposition (LSA), PLSA or LDA as described above. These methods analyze the document-feature combinations to determine latent variables that relate the documents to the features.

These topic models identify groups of words that represent the same topic using mathematical latent variable models. These models automatically produce "topics" that are used to categorize, group, and retrieve documents. To a first order, a document is characterized as a distribution of topics, where each topic is a distribution of words. This has the critical implication that documents about the same subject tend to be categorized and retrieved together, regardless of the presence or absence of a few specific keywords. So, for example, articles about "violence" associated with elections would be grouped, whether or not they used the terms "violence" or "government repression" or "rebel attacks on polling places" or the like. Topic-based categorization facilitates the retrieval process beyond the capabilities afforded by Boolean keyword search.

In one embodiment, Latent Semantic Analysis (LSA) is used as the preferred latent variable method (Landauer, T. K. and Dumais, S. T. (1997), "A solution to Plato's problem: the Latent Semantic Analysis theory of acquisition, induction and representation of knowledge." Psychological Review, 104(2), 211-240.), which uses an algebraic technique called Singular value decomposition (SVD) to reduce the sparsity of the overlap between documents (which might be about a similar topic, but use different words to describe it). In this reduced latent semantic space, documents are more similar on meaningful dimensions and can essentially find synonyms of query terms, improving recall.

SVD is a mathematical generalization, of which factor analysis is a special case (Berry, M. W., Dumais, S. T. & O'Brien, G. W. (1995), "Using Linear Algebra for Intelligent Information Retrieval" SIAM Review, 37(4), 573-595.; and Deerwester, S., Dumais, S., Furnas, G., Landauer, T., and Harshman, R. (1990), "Indexing by latent semantic analysis." Journal of the American Society for Information Science, 41(16), 391-407.). It constructs a K dimensional abstract semantic space in which each original term and each original (and any new) document are presented as vectors. SVD decomposes the word-by-document matrix A into the product of three other matrices: a matrix U defines the word space, a matrix $V^T$ defines the document space, and a diagonal matrix $\Sigma$ of singular values in decreasing order of magnitude relates the two, that is, $A=U\Sigma V^T$.

To reduce the dimensionality of the original data matrix, only the largest K singular values of $\Sigma$ are kept. One of the most important theorems of SVD is that $A \approx A_K = U_K \Sigma_K V_K^T$, where $\Sigma_K$ is K-by-K dimensional matrix taken from the upper left corner of $\Sigma$. The reduced matrix $A_K$ corresponds to a least-squares best approximation to the original matrix A, capturing the strongest, most meaningful, regularities in the data.

LSA has been shown to be better than keyword search at information retrieval, and is commonly used to automatically score essays with the same reliability as humans. However, it suffers a number of limitations. First, one global space is created to hold all terms, however, many words have multiple meanings, e.g., "bank", or "Java". LSA represents multiple word senses through linear superposition and, therefore, different meanings are simply averaged together, reducing precision. For example, the word "arms" is polysemous, and has two very different meanings (though metaphorically related) in a document about weapons versus a document about hospitals. Therefore, LSA works best in limited, single topic domains where such confusion is limited.

Second, K should ideally be large enough to fit the real structure in the data, but small enough such that noise, sampling errors and unimportant details are not modeled (Deerwester et al., 1990). However, the amount of dimensionality reduction, i.e., the choice of K, is critical and an open issue in the literature.

Third, the vector dimensions are typically not interpretable, and may even contain negative values. What is recovered in LSA is similarity only, either between words or documents, but not similarity to "something": an idea or concept that could have some explanatory value. For this, additional techniques are required such as finding clusters of terms in the latent semantic space.

In the last decade, a number of statistical methods have emerged that address these issues and add further functionality. Probabilistic Latent Semantic Analysis (PLSA) is an unsupervised machine-learning technique that differs from the more traditional LSA technique in that it is a statistical model, giving it a number of advantages. The most important benefit is the use of "topics," a mixture of which is modeled as generating the words in a document. The meaning of the word "lead" in documents from two different topics can, therefore, be distinguished. Additionally, the topics themselves can be interpreted and, thus, become an explanatory component for visualization and allow for spot inspection of performance.

The PLSA model has been shown to be more accurate than LSA for information retrieval (Hofmann, Thomas (1999), "Probabilistic Latent Semantic Indexing, Proceedings of the 22nd Annual ACM Conference on Research and Development in Information Retrieval" which could be found at the time of this application at http://www.cs.brown.edu/people/th/papers/Hofmann-SIGIR99.pdf) and has been deployed in legal, medical and publishing domains with large knowledge repositories. While originally developed to analyze text documents, PLSA can also be applied to other domains, such as tagging of non-text parts of information products (e.g. data from sensor sources, imagery, video, audio, maps), without requiring automatic object recognition. Several examples of recent successful applications of the PLSA algorithm to the image classification problem can be found in Si Sivic, J., Russell, B., Efros, A., Zisserman, A. and Freeman, W. (2005), "Discovering object categories in image collections." Proc. Int'l Conf. Computer Vision, Beijing and Fei-Fei, L. and Perona, P. (2005), "A Bayesian Heirarcical Model for Learning Natural Scene Categories", Proc. CVPR.

Specifically, the latent variables, or topics, represent information that maps between document distributions and word distributions. PLSA assumes that words from the document are produced as follows (Hofmann, 1999):

PLSA specifies a probability distribution for the set of topics given words, and a distribution for a set of words given a topic for the document. Using this process, any given word in a corpus can be probabilistically associated with any given document, through a translation into a joint probability model:

$$P(d_i, w_j) = P(w_j | d_i) P(d_i),$$

$$P(w_j | d_i) = \sum_{k=1}^{K} P(w_j | z_k) P(z_k | d_i)$$

The associations that arise out of the PLSA model imply that a given word need not appear in a particular document in order to be associated with it. This occurs because the latent concept variables ($z_k$) form a probabilistic mapping from documents to words, thus revealing the value of the latent topics.

Latent Dirichlet Allocation (LDA) was introduced by Blei et al. (2002) to improve upon a number of technical issues with PLSA. Both PLSA and LDA are generative models, i.e., each document is modeled to be generated by a mixture of topics, and each word in a document is generated by a single topic chosen from the mixture. PLSA derives the topic mixtures using the documents themselves; therefore, the generative model is not well defined, grows with the number of documents, and artificially assigns probabilities to new documents. LDA, however, treats the topic mixture weights as a hidden random variable and places a Dirichlet prior on the multinomial mixing weights. This removes the training documents themselves from the equations.

LDA also allows one to create a single model integrating other aspects of the documents, such as short range syntax (Griffiths, T. L., Steyvers, M., Blei, D. M., & Tenenbaum, J. B. (2005), "Integrating topics and syntax." Advances in Neural Information Processing Systems 17) and metadata such as the author or source (Rosen-Zvi, M., Griffiths T., Steyvers, M., & Smyth, P. (2004), "The Author-Topic Model for authors and documents." 20th Conference on Uncertainty in Artificial Intelligence) or other arbitrary metadata (Mimno, D. and McCallum, A. (2008), "Topic models conditioned on arbitrary features with Dirichlet-multinomial regression." Proceedings of Uncertainty in Artificial Intelligence, Helsinki, Finland). Thus, LDA is just as powerful as PLSA, but is a much more extensible model. In addition, if the repository is rapidly changing, LDA training of the probability distributions of topics and words is much smoother since the actual documents are not essential as in PLSA.

LDA assumes that words that occur in different documents are drawn from K topics, and each topic can be characterized by a probability distribution over words. It then models the distribution over words in any one document as a mixture of those topics:

$$P(w_j) = \sum_{k=1}^{K} P(w_j \mid z_j = k) P(z_j)$$

where $z_j$ is a latent variable indicating the topic from which the jth word was drawn and $P(w_j|z_j=k)$ is the probability of the jth word being in the kth topic. The words likely to be used in a new document can be determined by estimating the distribution over topics for that document, corresponding to $P(z_j)$. Thus, $P(w|z=k)$ indicates which words are important to a topic, while $P(z)$ is the prevalence of those topics within a document.

Like PLSA, LDA gives a procedure by which documents can be generated. First, a distribution over topics θ is chosen which determines the $P(z_j)$ for words in that document, as opposed to PLSA where a document must be chosen first. Each time a word is added to the document, a topic is chosen according to this distribution, and a word from that topic is chosen according to $P(w_j|z_j=k)$.

Certain topic model techniques can also be used which take advantage of the temporal information itself such as topics-over-time (as described at the time of this application in Wang & McCallum (2006) at http://www.cs.umass.edu/~mccallum/papers/tot-kdd06.pdf) or dynamic topics (as described at the time of this application in Blei & Lafferty (2006) at http://www.cs.princeton.edu/~blei/papers/BleiLafferty2006a.pdf). For example, these methods can detect a pattern whereby elections that followed changes in the constitution tended to be followed by violence, while elections that did not follow such changes did not lead to violence. In addition to finding such patterns, these methods will, of course, facilitate retrieval of relevant documents, enabling users to apply their knowledge, training, and human reasoning abilities to the problem.

In any case, at the end of the latent variable method are topics and topic values 138 which define the probabilities of words, collocations, and other features for each topic. It is understood that some methods might not clearly separate the steps 132-138.

Given the topic modeling results from step 130, the next step of this embodiment is to look back through the historical documents and transform the data into a topic profile. In this embodiment, this is done by profiling the topic activity over a dimension in step 140 by applying the latent variable method to different sets of that dimensionality. For example, by profiling the topic activity over sets of time, the end result is a topic profile indicating the level of activity in a topic (which corresponds to a behavior) at any given historical time which could be viewed by a user interactively.

Given the profiling of the topics over the dimensions of step 140, the next step is to predict topic activity over the dimension as in step 150 and provide the prediction as an output. If the dimension is time, then it is possible in step 150 to use historical profile data to predict topic values in the future. A variety of methods are available to perform this prediction. One such method is to use the similarity capabilities of the topic models to find the D days in the past most similar to a test day (e.g., today) and then the predicted topic values F days after the test day are predicted to be a weighted average, or other combination, of each of the activity of the topics F days after each of the D days, with the weight based on the similarity. Such similarity methods include, but are not limited to, the similarity methods described earlier such as treating the topic profiles as vectors and using the cosine of the angle between the vectors as similarity, using the inverse of the Euclidian distance, or more generally the Minkowski distance, between the two points in space as the similarity, or using other similarity and inverse distance metrics such as comparing the distribution of topic probabilities of the two topic profiles using Kullback-Leibler divergence.

Another method for making predictions in step 150 would be to create an explicit temporal model, such as vector autoregression, non-linear recurrent networks, hidden Markov models, or conditional random fields. In this case, the sequence of topic activities of each historical day or other time period are used as the sequence of input vectors to train the models. Then the most recent sequence of topic activities is used as input to predict the next day's activities, and these predictions are fed back into the model to determine the next day, etc. In any case, the predicted values of the topics selected would be determined by running the selected topic profile/sequence through the VAR repeatedly, or through the recurrent neural network repeatedly.

Vector autoregression (VAR) and related models can also be used to perform step 150. VAR and related models more generally subsumed under the rubric of (vector) autoregressive fractionally integrated moving average (AFIMA) models, and more complex, non-linear models such autoregressive conditional heteroskedasticity (ARCH) models are often used to model econometric data. In VAR, a weighted sum of the previous time unit's activities is used to make a prediction:

$$x_t = a + \sum_{i=1}^{p} \Phi_i x_{t-i} + \varepsilon_t$$

where $x_t$ is the topic profile for a given time unit, a is a constant vector, p is the total number of previous time units' topic profiles we will use, $\Phi_i$ is the covariance matrix relating activity i time units back to the activity of the current time unit t, and $\varepsilon_t$ is Gaussian noise with zero mean.

Although this embodiment addresses the analysis and prediction of topics over a period of time, it is also contemplated that these methods can be applied to relationships of topic activity when compared to other data elements that are not time related. For example, topic activity may be compared to the presence of elements, a sequence of activities or topic activity over a graphic or geographic space or location. It is also contemplated that topic activity may be compared to more than one dimension of data.

This embodiment is finished with step 160.

Another embodiment of the methods comprises using a topic profile to predict a temporal data set that may not need to have a topic profile. For example and not for limitation, temporal data sets such as financial data, stock prices over time, sports statistics, financial averages, the Dow Jones Industrial Average can be compared to another data set that has been analyzed to create a topic profile. Using the predictive modeling techniques, the topic profile can be used to predict the temporal data set that does not have a topic profile.

Another embodiment of the method comprises using a third set of focus features to help define topics, topic values and topic profiles. In such embodiments, these focus features are used by the latent variable methods to create focus topics, focus topic values and focus topic profiles from data sets. For example, a third set of data, comprising terms and features related to an area of interest, such as chemistry, psychology, business, or some other area of human endeavor, could be used to focus the topics derived from the textual source. Then, these features and only documents containing these focus features would comprise the word-by-document matrix used in the latent variable method.

In some embodiments, the focus topic is a valence topic. In these embodiments, adjectives related to concepts to such as large vs. small, growing vs. shrinking, flourishing vs. dying, etc. could be used as focus features or terms to limit the terms and documents used by the latent variable method.

For those embodiments that incorporate focus topics, the predictive methods as described above would include the focus topics as the topics and also include a base focus topic, focus topic values, base focus values, most similar focus topic value and a predicted focus topic value.

One Embodiment of the Predictor System

As will be readily apparent to those skilled in the art, the present invention can be realized in hardware, software, or a combination of hardware and software. Any kind of computer/server system(s), or other apparatus adapted for carrying out the methods described herein, is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The following discussion provides a brief, general description of a suitable specific computing environment in which one embodiment of the present invention may be implemented. The invention will often be practiced on a single computing device, but can also be implemented on a client computing device and/or a server or other remote computing device connected by a communication network.

Figure 2:
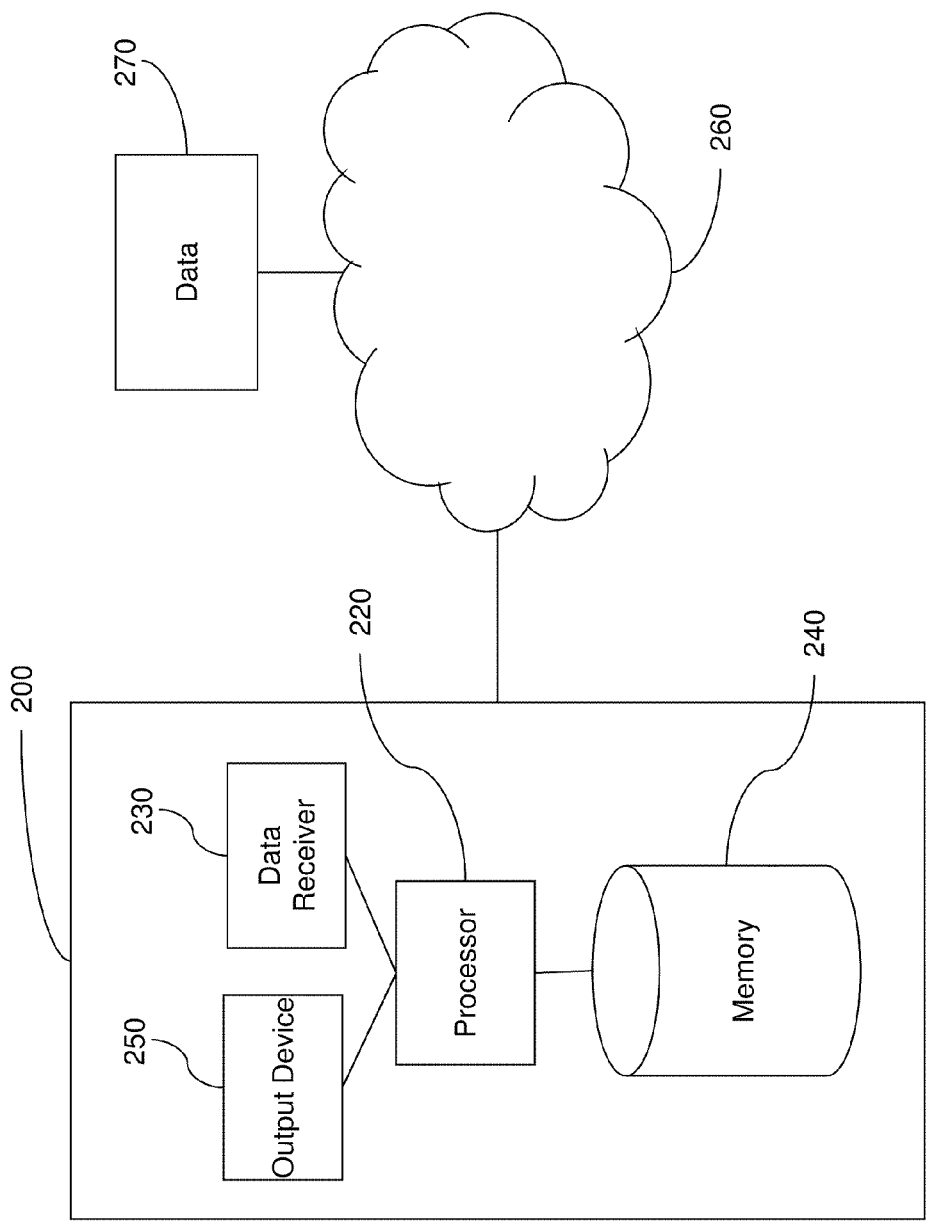
FIG. 2 is an illustration of one embodiment of the predictor system.

FIG. 2 illustrates a high level system diagram of a computer based embodiment of the predictor system 200. The computer based predictor system 200 comprises: memory 240 in which are stored machine instructions that define a plurality of functions; an output device 250 to output results of the system; a data receiver 230 for the receipt of data; at least one processor 220 that is coupled to and capable of communicating with the memory, the output device and the data receiver; and the processor executing the machine instructions to carry out the plurality of functions. As shown in this figure, but not required, the computer based predictor system 200 is also in communication with a network 260 that is capable of sharing data from multiple sources such as web sites and communications data 270 over a network such as the Internet or other communications network.

Those skilled in the art will appreciate that this invention might also be practiced with other computer system configurations, such as a client device for executing personal productivity tools, including hand-held devices, pocket personal computing devices, other microprocessor-based or programmable consumer electronic devices, multiprocessor systems, network PCs, minicomputers, mainframe computers, and the like. Furthermore, the present invention can also be practiced in distributed computing environments, where tasks are performed by remote processing devices that are linked through a communications network. In a distributed computing environment, machine instructions may be located in both local and remote memory storage devices.

The present invention, or aspects of the invention, can also be embodied in a computer program product, which comprises all the respective features enabling the implementation of the methods described herein, and which—when loaded in a computer system—is able to carry out these methods. Computer program, software program, program, machine instructions or software, in the present context mean any expression, in any language, code or notation, of a set of instructions intended to cause a system having an information processing capability to perform a particular function either directly or after either or both of the following: conversion to another language, code or notation; and/or reproduction in a different material form.

The Data Receiver:

The data receiver receives the data to be analyzed and used in the disclosed methods. The data receiver can be any type of network connection known to those of ordinary skill in the art for connecting to the Internet, a private IP network in a Wide Area Network or Local Area Network (LAN). Suitable receivers include but are not limited to network interface cards (NIC), modems and other network connection devices. It is also understood that the data receiver may be a device capable of storing and transferring data to the predictor system. For example, the data receiver may be a digital media device such as a USB connection capable of receiving data from a USB device, a CD/DVD reader capable of receiving data from a CD/DVD or a set of machine readable instructions capable of creating or reading data from a program such as a software spreadsheet program or a email program accessed with a device such as a keyboard.

One embodiment of the data receiver 230 comprises a processor communicating with Ethernet-based LANs supporting and implementing the well-known TCP/IP or UDP/IP protocols. In this embodiment, the data receiver is a network interface card (NIC) communicating with the processor and the data network. In this embodiment, the data receiver receives data by searching on-line sources of news information and stores the information in memory.

An example of another embodiment of the data receiver 230 includes a NIC in communication with the processor 220 and a news aggregator or a really simple syndication (RSS) feed communicating formatted data, such as extensible markup language (XML) formatted data, over a data network.

Other embodiments of the data receiver 230 comprises a scanner, fax or other transformation technique to transform physical information such as photos, newsprint or other documents into digital data that can be received by a specially programmed computer to perform the methods disclosed in this description.

One Embodiment of the Output Device

Shown in FIG. 2, the output device 250 comprises the way the output of the disclosed methods is shared with the user. In one embodiment, the output device 250 comprises a computer monitor in communication with the processor and this monitor is able to display data and results such as the predicted topic values. In a preferred embodiment, the display allows the user to visually see the topic profiles and also allows the user to select multiple dimension values that represent different prediction time frames. The output device may also allow user input, such as manual topic value entry, or manual topic selection or topic de-selection to help a user refine the topics, data and/or system outputs. Other embodiments of the output device include other display or alarming devices in communication with the machine instructions described herein. Examples of suitable output devices include, without limitation include a phone, a PDA, an audible alarm, faxes or printed documents.

One Embodiment of the Machine Instructions

In a preferred embodiment of this predictor system, the processor 220 accepts user input and executes machine instructions to carry out the plurality of functions, including the methods described herein. The machine instructions stored in memory 240 and accessed by the processor 220 to carry out the functions of the machine instructions.

Figure 3:
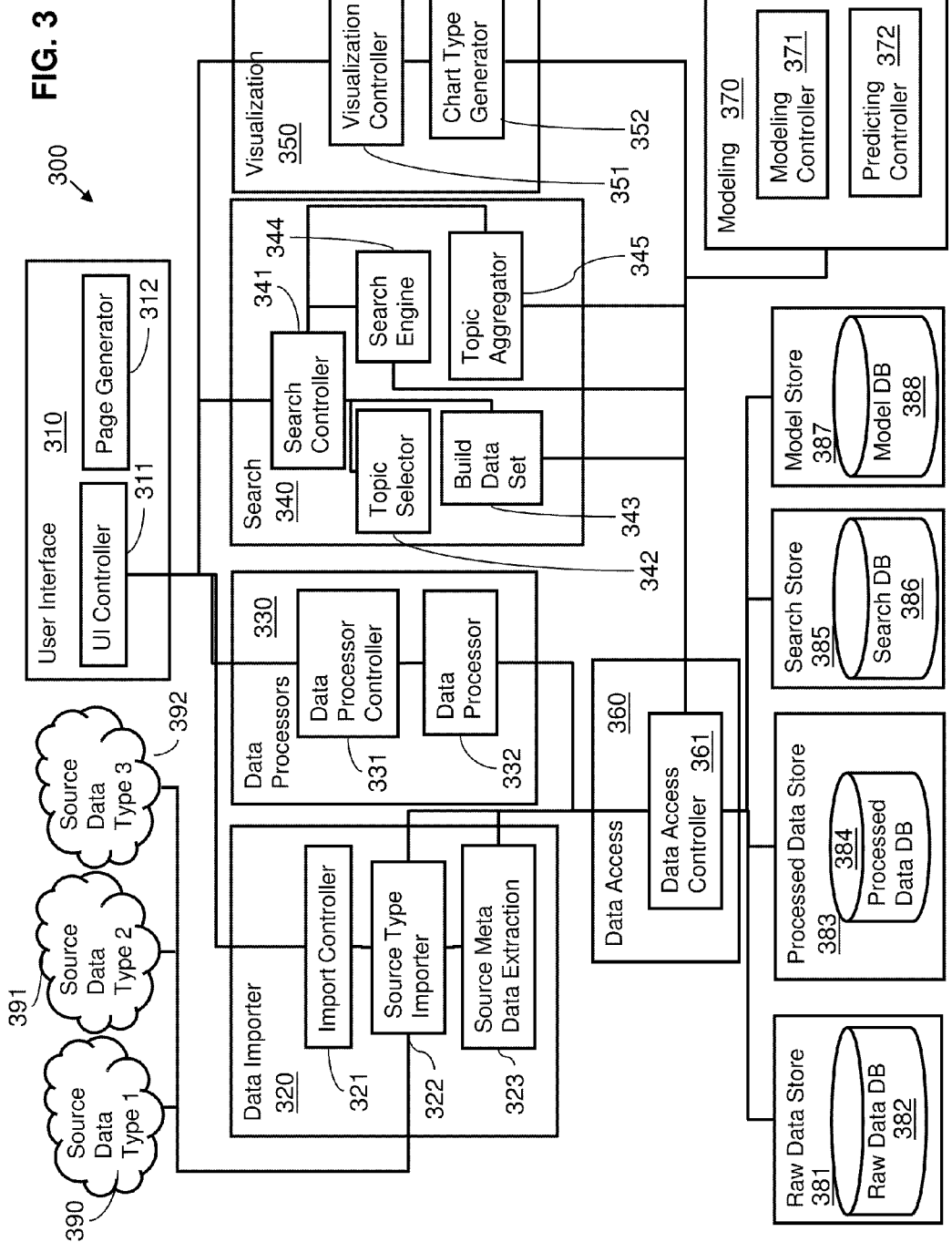
FIG. 3 is a graphical representation of the components of the machine instructions according to one embodiment of the invention.

One operational embodiment of the machine instructions of the system is shown in a system level diagram in FIG. 3.

FIG. 3 shows a component diagram of one operational embodiment of the predictor system machine instructions 300. This view shows how the functionality of this embodiment is partitioned into components, the major interfaces between those components and the interfaces between the system and the external world. The machine instructions are a grouping of components that represent functions such as would be found in software code. In this embodiment, the predictor system comprises several different packages that further comprise different components interrelated as shown. The machine instructions include: a data access package 360, a data importer package 320, a data processors package 330, a search package 340, a user interface package 310, a visualization package 350, a processed data store package 383, a raw data store package 381, a search store package 385, a model store package 387 and a modeling package 370. In this embodiment, the packages and components for this embodiment are interrelated as shown in FIG. 3.

The data access package 360 comprises the data access controller component 361 and this component controls access to the data stores. In this embodiment, the data stores comprise a raw data store 381, a processed date store 383, a search store and a model store 387.

The data importer package 320 comprises the components: import controller 321, source meta data extraction 323 and source type importer 322. The import controller component 321 controls the data importing process independent of the source data type and could support multiple data source types such as the source data type 1 390, source data type 2 391, and source data type 3 392 shown. The source meta data extraction component 323 provides the ability to extract metadata from the source data. This might be as simple as the published date of a news article, or extracting the topic keywords that are supplied by a news article. The source type importer component 322 provides functionality to import a specific source data type such as functions for reading RSS feeds, reading from databases, extracting text from files such as those created by word processing software, reading information from Web pages, or other types of documents. The above described import controller component 321 could support multiple source type importer components for different source data types.

The data processors package 330 comprises a data processor component 332 and a data processor controller component 331. The data processor component 332 provides for the transformation of the raw data into commonly required searchable data and the standard text pre-processing described above. The data processor controller component 331 controls the data processing of the raw data into processed data and can support multiple data processor components 332 depending on the required capability.

The search package 340 comprises a build data set component 343, a search controller component 341, a search engine component 344, a topic aggregator component 345 and a topic selector component 342. The build data set component 343 builds the data set that will be searched by the search engine algorithm. The data set will consider date range, topic or word frequency threshold or any other characteristics that might be important for the data set to consider. There could be multiple instances of the build data set component and they would plug into this architecture as long as they meet the interface definitions. The search controller component 341 controls the execution of the search process. The search engine component 344 implements a particular algorithm to match selected topics (from the topic selector component), to a set of historical days. The topic aggregator component 345 takes the topics from a set of days and combined them into a single topic profile. The topic selector component 342 can select topics from a variety of methods such as from an example historical day, a topic selection, or a word selection The user interface package 310 comprises a UI controller component 311 that takes commands from the user and controls the components of the system to carry out the commands. The user interface package 310 also comprises a page generator component 312 that generates the output, such as web pages, to be displayed to the user.

The visualization package 350 comprises a chart type generator component 352, a realization component and a visualization controller component 351. The chart type generator component generates a visualization based on a set of criteria from the user and a search. For example, the activity of a set of topics predicted into the future for N days. The visualization controller component 351 controls the generation of visualizations and other results output and can control multiple chart type generator components.

The processed data store package 383 comprises a processed data database (DB) component 384 that stores processed results of the raw data, such as frequencies of words or other features in particular articles over time.

The raw data store package 381 comprises a raw data DB component 382 that stores the raw source data that could be news articles or documents and some of these might be referenced to external sources (e.g. for licensing and copyright reasons).

The search store package 385 comprises a search DB component 386 that stores the saved searches that are sufficiently specified to re-generate consistent results set over time.

The modeling package 370 comprises a modeling controller component 371 and a predicting controller component 372. The modeling controller component 371 generally performs the latent variable methods. The predicting controller component 372 generally performs the time series analysis. These components comprise machine instructions that are stored in memory and are accessed by the processor to implement the instructions. These components perform the latent variable methods or time series analysis on stored data such as may be in the system stores 381, 383, 385 and 387 accessed through the data access package 360.

The modeling controller component 371 has machine instructions to analyze the data and create topics using software implementations of the methods described earlier such as LSA, PLSA, LDA or any other latent variable method. Through the special machine instructions the latent variable method generates topics and topic values from the processed data in the processed data store.

The machine instructions in the modeling controller component 371 also implement the profiling of the data and topics to create topic profiles. The instructions to perform the profiling include software implementations of the methods described earlier and include applying the latent variable method to different sets of dimensionality to create a topic. The results of the modeling, such as the probabilities of words for each topic, or the probabilities of topics for each day and other such data, may be stored in a model store containing a model database.

The predicting controller component 372 has machine instructions capable of providing the functions that analyze the processed data to create topics and profile the topics over a dimension to create a topic profile and predict the topic value at a predicted dimension value. These machine instructions may implement the prediction of topic values based on the topics and topic profiles. The instructions to perform the predicting include software implementations of the time series methods described herein and include methods such as using the similarity capabilities of the topic models and explicit temporal models to predict topic values. The data associated with these temporal models may also be stored in the model database component 388 of a model store package 387.

In embodiments that utilize focus topics, the source data type 3 392 can include one or more focus features to limit the data used in the latent variable methods.

One Embodiment of a Data Model

Figure 4:
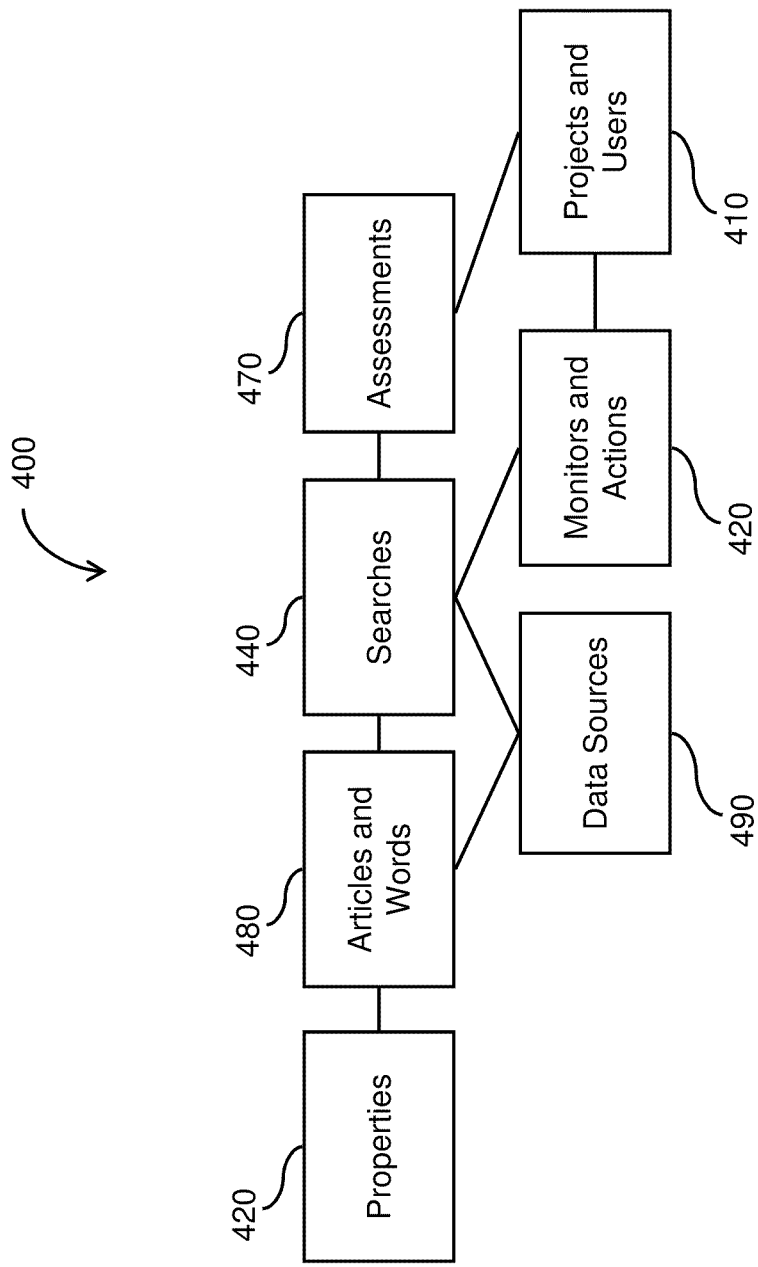
FIG. 4 is a schematic diagram of the data model utilized by one embodiment of the invention.

FIG. 4 shows a data model 400 for one embodiment of the predictor system machine instructions. With this model, the machine instructions above are able to store, process and manipulate data entities including but not limited to: Articles and Words 480—these are the articles and their associated words that have been extracted from the data sources; Properties 420—articles (and other entities) can have properties to provide additional information about the entity (i.e. the location the article is about); Searches 440—searches are the fundamental activity of the user who can define a search and save the search criteria for later re-use or cloning (to make changes) and searches reference a set of data sources and generate a set of articles and words; Assessments 470—these are used for the analysts to record and share their evaluation of the components of the search and the results; Data Sources 490—data sources are the sources for the information to be searched (i.e. newspaper articles and document libraries); Monitors and Actions 420—an analyst can define a monitor which will scan current data for search criteria and when the criteria are met, an associated action (such as an e-mail notification) can be executed; and Projects and Users 410—the system has the concept of a project to allow analysts to collect and name the work they are doing and to share and collaborate that work where an analysts can log into the system to identify themselves and to restore preferences and project context.

Operation of One Embodiment of the Predictor System

Figure 5:
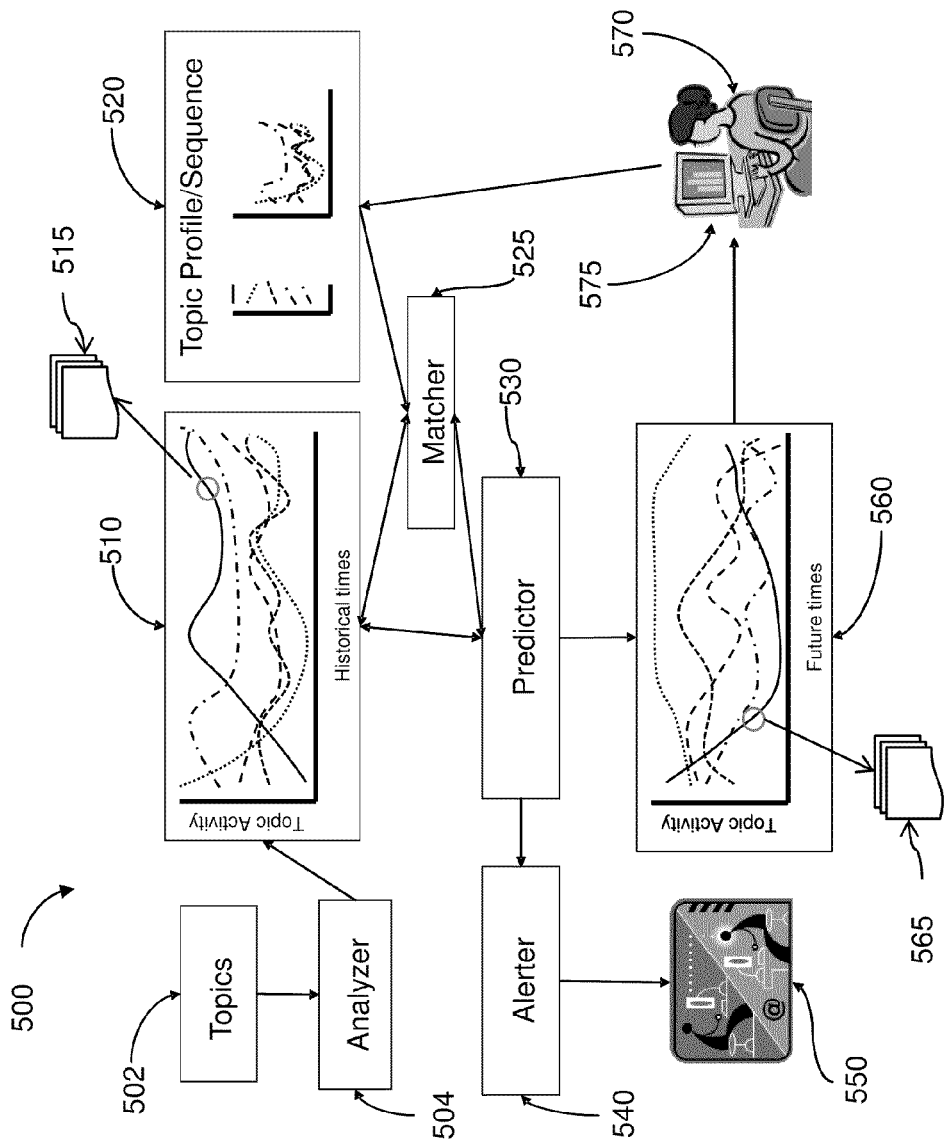
FIG. 5 illustrates a block diagram of one embodiment of a system for predicting the likelihood of topics in accordance with one embodiment of the present invention.

FIG. 5 shows one operational embodiment of the method described above in a computer-based predictor system. Within this predictor system 500, the topics 502 from the process (step 130 shown in FIG. 1) are inputted into an analyzer 504. It is understood that in this system it is possible that the data can be fed directly into the analyzer that in turn performs the analysis to create the topics. The analyzer 504 performs the analysis of topic activity over the historical times (step 140 in FIG. 1) to create topic profiles and contains the relative weights of different topics over the time units of the data provided (step 120 of FIG. 1) into this system. The topics and topic profiles are displayed to the user with an output device such as a monitor 510.

Within this predictor system 500, a user uses a computer as a user interface to select a topic profile or sequence 520 to access and manipulate data in the analyzer 504. A user interface such as a topic profile/sequence interface 575 can support interactive querying of masses of data in the analyzer 504, enabling human and statistical pattern detection to be blended. For example, an analyst could do what-if analyses by constructing queries to explore the hypothesis that elections following a change in the constitution to allow a ruler to run again resulted in more violence than elections that did not follow such a change (although the scope would probably have to be expanded beyond Nigeria to get an adequate sample).

In this embodiment, the matcher 525 performs some of the predicting functions described earlier. The matcher 525 would match the selected topic profile/sequence 520 to similar moments in the historical past of topic profiles 510, provided by the analyzer 504, which contained a similar profile/sequence. Any number of methods could be used to determine similarity including: 1) treating the topic profile 520 as a vector and the each day's worth of topic activities as a vector and performing a cosine match; 2) using the topic model itself to determine the probability of the historical topic profile given the user's topic profile; using hidden Markov models to match an Input Topic Sequence to a variable length sequence in the historical data. The times of profile matches could be viewed by a user interactively. Other data might be associated with the data displayed in 510 such as articles 615 associated with a particular topic and date.

A predictor 530, performs other prediction functions describer earlier. The predictor makes predictions using a number of methods such have been described above. One such method is an event-based model which uses the output of the matcher 525 to determine the N most similar days in the historical period when compared to the selected topic profile/sequence 520, and for each historical day, look at the topics 10 days later, then predict that the topics 10 days after the selected topic profile/sequence 520 to be a weighted average of the topics from the N similar historical days.

Another method to be used by the predictor 530 would be to use vector autoregression (VAR) as described earlier which would postulate a more cyclical model. More complex, non-linear models could be also used, such as recurrent neural networks. In any case, the predicted values of the topics selected as the topic profile/sequence 520 would be determined by running the selected topic profile/sequence through the VAR repeatedly, or through the recurrent neural network repeatedly. In this case, the matcher 525 would be skipped.

Other temporal prediction methods are also possible. One might define a list of dates on which particular events happened, e.g., every day that a suicide bombing occurred in Israel. The topic profiles from the 10 days previous to this event could be obtained, and then hidden Markov models (HMMs) trained to discriminate sequences of topic profiles that occur before suicide bombing from those sequences that do not.

Regardless of the temporal method used in the predictor 530, at least two functions can be enabled. One function is an alerter 540 as a type of output device. The type of output that would come from the alerter could be determined by a user. For example, the alerter could alert him/her/others to a topic activity predicted to be greater than some threshold at some near-term future point. With the alerter 540 in this embodiment, the system would receive recent data (e.g., today's news) into the analyzer that would also feed the matcher/predictor system. If the topic "bombings" were then predicted to be above a certain threshold, or simply one of the top 10 topics predicted to be active, in the next week, then an alert could be sent to all those subscribers 550 to such an alert.

In other embodiments, additional functionality derived from the predictor 530 could be an interactive process whereby a user 570 can view the predicted activities of all topics over any period of time in the future (if using the most recent data as input) or as research into what was/is likely to happen given any topic profile/sequence selected. Upon viewing the results though the output device 560, the user 570 can make adjustments to the selected topic profile/sequence 520 to refine the search and reinitiate processes such as the matcher 525, the predictor 530 and the output device 560. Similarly to the historical topic activity graph 510, the user may be able to use the output device 560 to retrieve data associated with a topic and a time in the future 565, such as articles from the past that occurred after best matched times found by the matcher 525.

Figure 6:
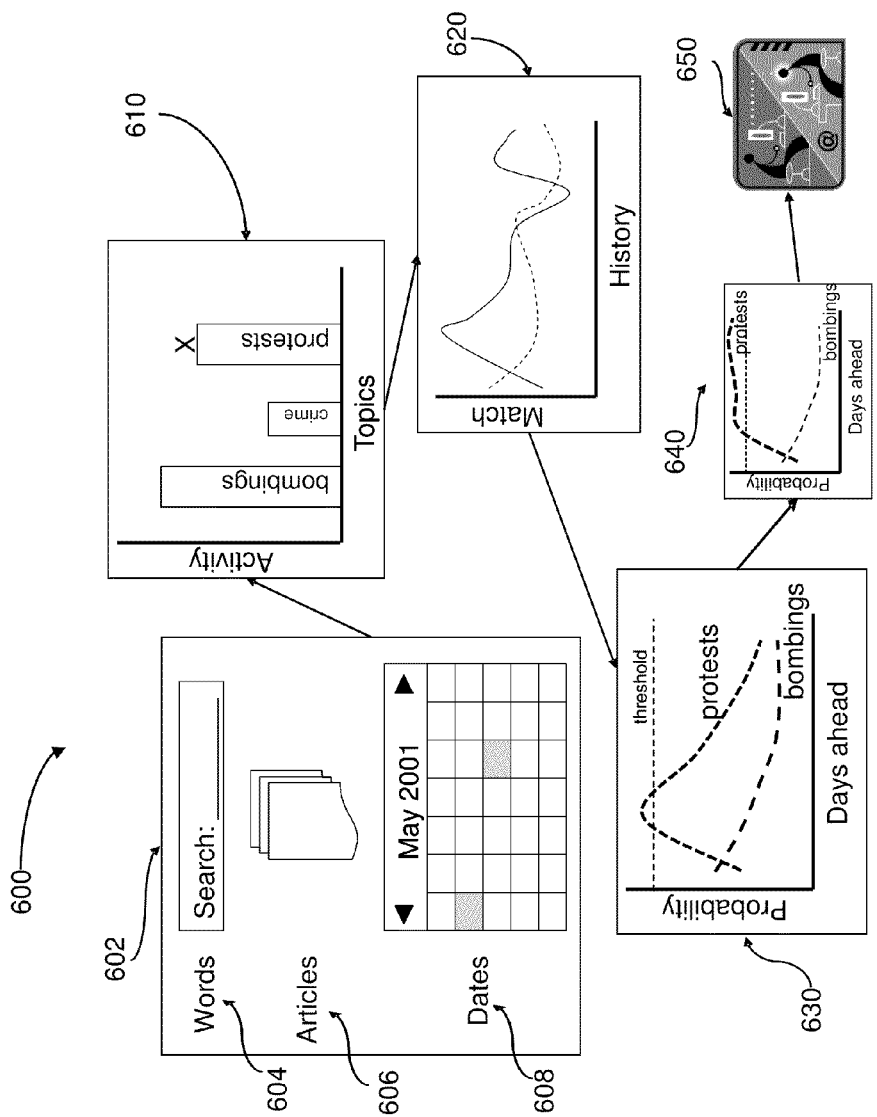
FIG. 6 illustrates a block diagram of another embodiment of a system for predicting the likelihood of topics in accordance with one embodiment of the present invention from the focus of the user.

FIG. 6 shows one embodiment of a predictor system 600 similar to that illustrated in FIG. 5 from the perspective of the user utilizing the topic/profile/sequence interface. These interfaces would typically be made available to the user through the system output device or a similar user interface. The user can create a topic profile/sequence via three different selection methods 602: by word query 604, by selecting articles 606, or by selecting date ranges or particular dates 608 (e.g., all of the day's news). The words and features from this selection would allow the analyzer (such as 504 in FIG. 5) to create a histogram of topics 610 related to the words/features in the query/articles/date. Some of these topics might not be of interest; in this case, as shown in FIG. 6, the "protest" topic is X'ed out so it will not be used to find historical dates that had a similar mix of topics.

Referring again to FIG. 6, given the mixture of topics in which the user is interested, a historical graph 620 would be presented which shows the degree to which dates in the past had the same mixture of topics. The match to the topics of interest could be presented either as a whole, or the match to each topic could be presented individually (the gray line in 620). The user could potentially click on those dates that had the best match (of one or all of the topics), and read articles related to those events. In any case, based on what happened after those best-matched dates (via processes 525 and/or 530 of FIG. 5), a prediction of topics likely to appear in the days ahead would be shown in 630 as in 560 of FIG. 5. This subfigure indicates that more of one type of activity (namely "protests") is likely for a few days, and that the probability of other activities (namely "bombing") is decreasing. Also shown here is the threshold value set to trigger the Alerter.

A combination of the outputs of more than one matcher and predictor could be shown, and/or combined into, one prediction per/topic.

Given a view of the probable topic activities 630, the user could then apply modify each topic's predictions 640 in order to indicate the user's assessment of the probability and importance of each topic occurring in the future. In the case shown in FIG. 6, the user has modified the forecast of "protests" to stay high within in the time frame of graph, rather than decreasing after a point as predicted by the model in 630. Other interactions are also possible, such as eliminating predicted topics from the graph that are deemed unimportant. The user could then share the entire search, along with his/her assessments of probability and importance, with other users 650. Along with providing a focused means of discussion, all the assessments could be combined, such that the probabilities shown in 630 could be modified to show the consensus assessment of the probability of that topic. For example, the consensus of the analysts might be that there is no probability of protests, in which case that line would be shown to be near zero. Alternatively, the assessment of different users and the model outputs could be combined selectively based on user choice, or automatically chosen based on the reliability of the user or model (in the case that multiple models are run simultaneously).

Once the described computer based systems are programmed to perform particular functions pursuant to machine instructions from software that implement the methods of this invention, such computer based system in effect become special-purpose computers particular to the methods of this invention. The techniques necessary for programming the machine instructions are well-known to those skilled in the art of computer based systems.

Alternative Embodiments of the Predictor System

Figure 7:
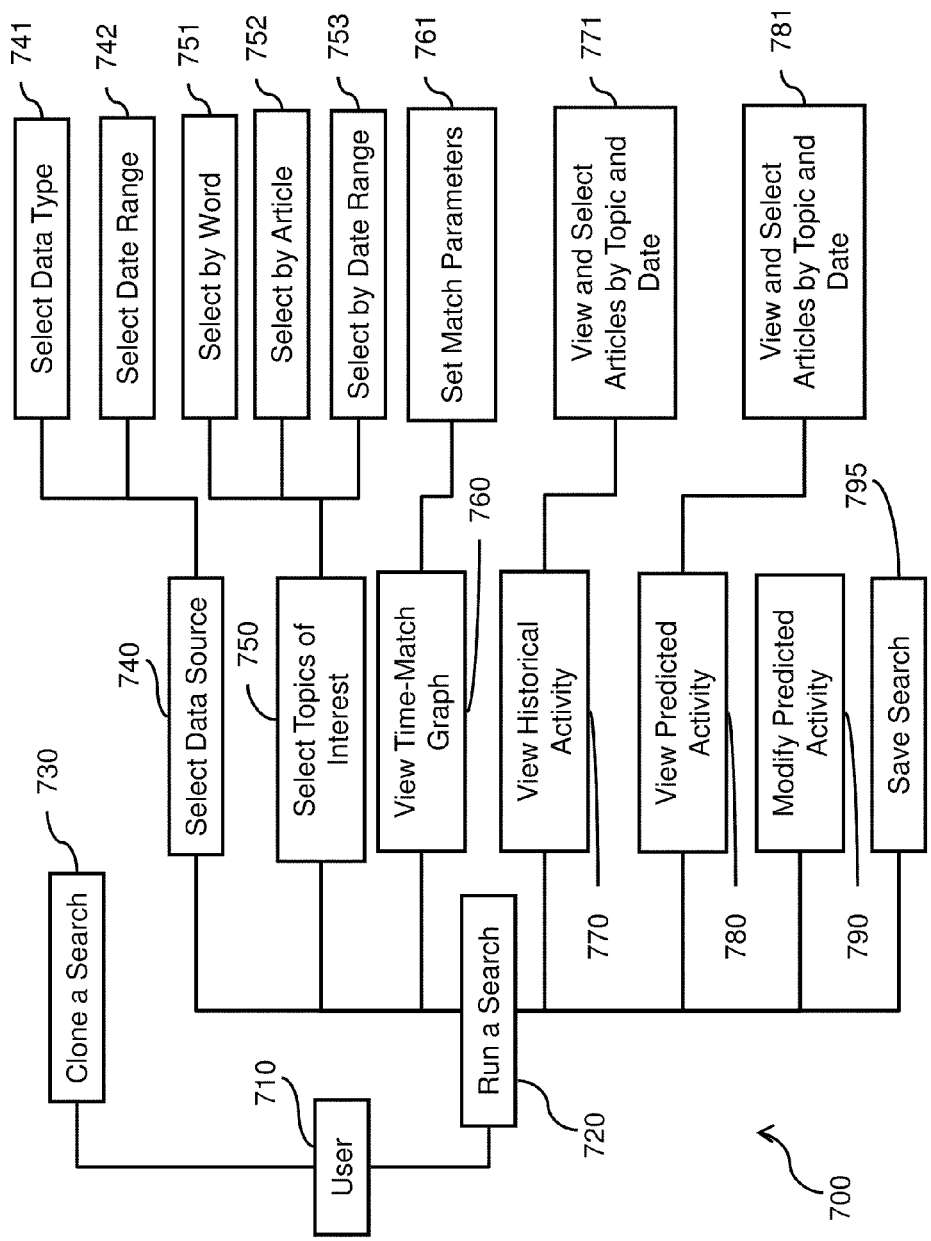
FIG. 7 illustrates one embodiment of a set of use cases for the predictor system search functions.
Figure 8:
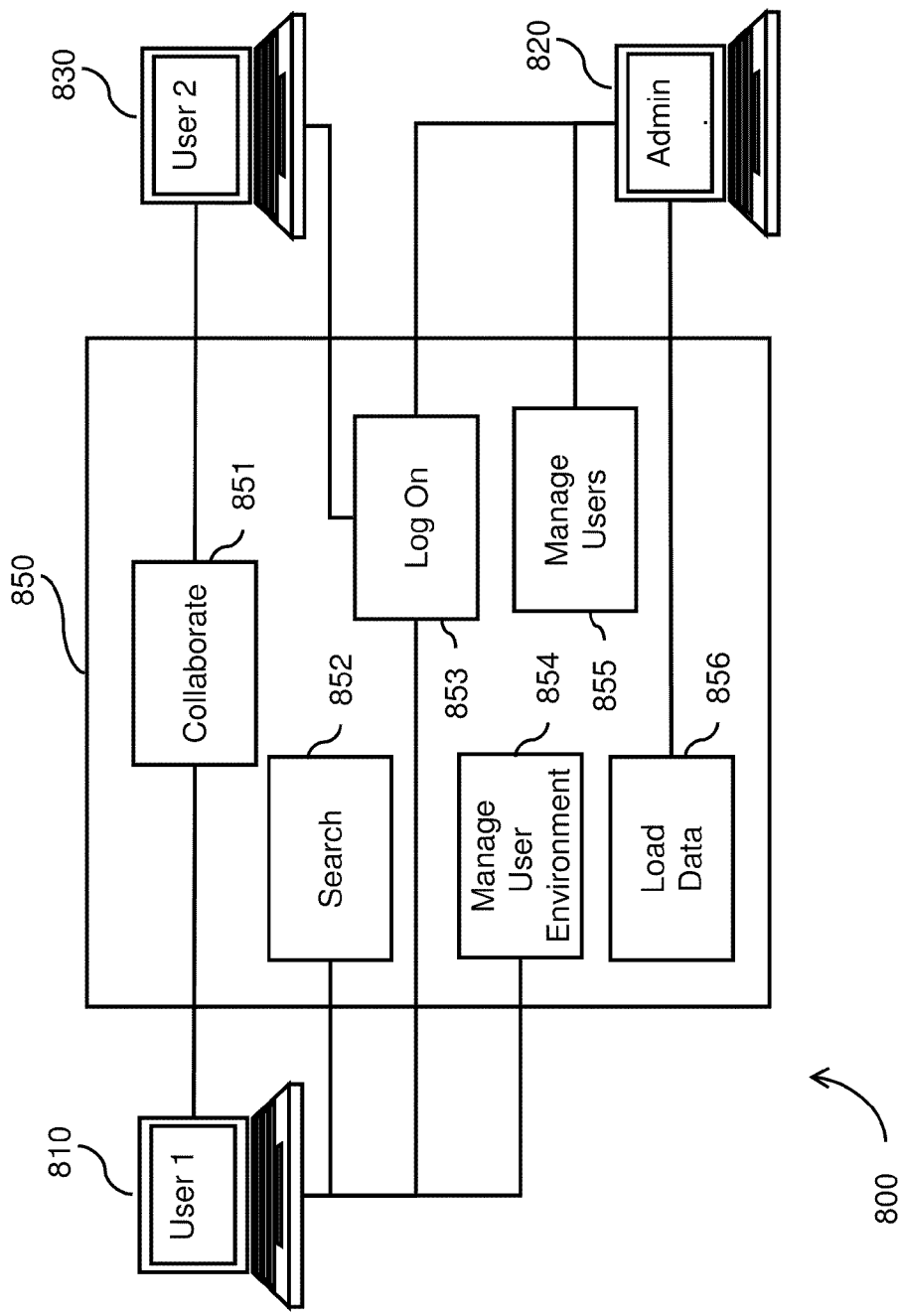
FIG. 8 illustrates a top level use case of one embodiment of the predictor system.
Figure 9:
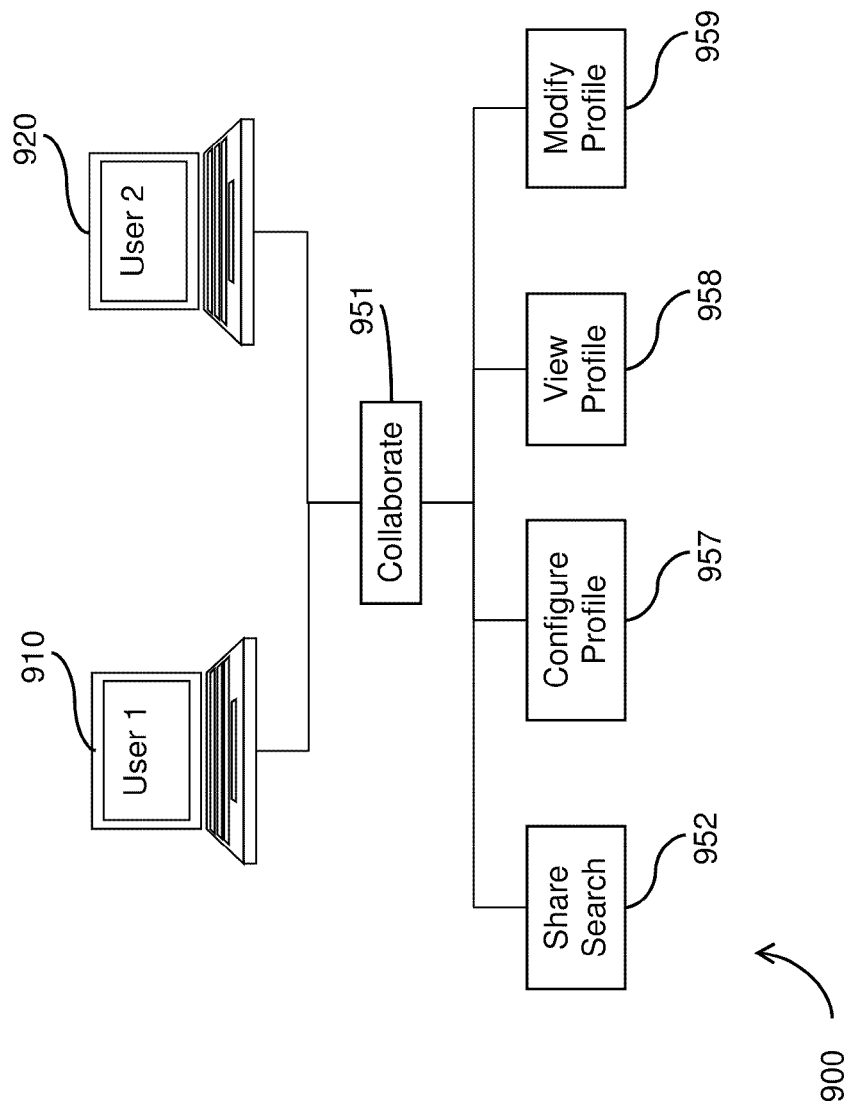
FIG. 9 illustrates a top level use case of another embodiment of the predictor system.

FIGS. 7-9 show functional diagrams of other embodiments of computer based predictor systems that can perform the methods of this invention. Other embodiments of computer based predictor systems can also be employed to perform the methods of this invention, and to the extent that a particular system embodiment is capable of performing the methods of this invention, it is equivalent to the representative computer based system described herein and within the scope and spirit of this invention.

Alternative Embodiments to Enhance Query Types

It is contemplated with alternative embodiments of this invention, it is possible to support interactive querying of masses of data, enabling human and statistical pattern detection to be blended; for example, an analyst could do what-if analyses by constructing queries to explore the hypothesis that elections following a change in the constitution to allow a ruler to run again resulted in more violence than elections that did not follow such a change (although the scope would probably have to be expanded beyond Nigeria to get an adequate sample).

FIG. 7 shows a more detailed set of use cases for the predictor system search functions with additional model semantics. The main functions shown in FIG. 7 are: Run a Search 720—this is the top level function to execute a search for topics and generate predictions; Select Data Sources 740—these functions allow the analyst to select the data sources they want to use in the search function such as selecting a data type 741 or a date range 742; Select Topics of Interest 750—these functions allow the analyst to specify the criteria they want to use to identify the topics to be used in the search such as selecting by word 751, article 752 or date range 753; View Time-Match Graph 760—these functions allow the analyst to view the matched topics between a given day (such as today) and days in the past by setting match parameters 761; View Historical Activity 770—these functions allow the analyst to view past activity by selecting articles and topics by date 771; View Predictions 780—these functions allow the analyst to view the prediction results in a variety of ways such as viewing and selecting articles by topic and date 781; Modify Predicted Activity 790—these functions allow the analyst to modify data sets if desired; and Save Search 795—these functions allow the analyst to save data and searches. Clone a Search 730—these functions allow the analyst to create a new search starting with the setup of a previous search.

Additional embodiments of this invention will support querying, retrieval, and collaboration as illustrated below by briefly discussing a number of specific examples of its potential application. The following types of queries could be supported for the individual analyst:

Query article retrieval: The user types a query and gets a ranked list of articles. The retrieval and ranking of articles (and the "parsing" of the query) would use latent variable topics, and thus go beyond keywording.

Topic article retrieval: This is similar to the previous type, but here the user selects a topic from those that embodiments of this invention has identified in the corpus and then gets a ranked list of articles related to the selected topic or topics.

Query date retrieval: The user types a query and gets a ranked list of dates which are most relevant to the query. (This type of query, and those below on the list, incorporate embodiments of this invention's temporal indexing capabilities.)

Topic date retrieval: This is similar to the previous type, but here the user selects a topic from those that embodiments of this invention have identified in the corpus and then gets a ranked list of dates.

Date topic retrieval: The user types a query and date or date range and gets a ranked list of topics associated with that date.

Time-forward-date topic retrieval: Here, the user chooses a topic and time-forward offset and gets a list of topics that appear on the forward date. (For example, the user could find the topics that were most prevalent one week after an election in Nigeria that was accompanied by wide-spread protests.)

Time-backward-date topic retrieval: This is the same as the prior query, but here the user searches backward in time by a desired temporal offset from the selected date.

Date topic-by-date retrieval: The user selects a date, and sees a timeline of topics following and/or preceding that date. The user will also be able to click on the topic in the timeline and get a list of articles for that day with that topic.

Future topic-by-date retrieval: The user will get a timeline of expected topics for various future temporal offsets from the current date. By clicking on a topic in the time line N-days after a day like today (i.e., a day that has a similar topic mix to today), the user gets a list of articles from the past that had that topic.

Only the first two types are typically available to users (e.g., at the OSC available at the time of this application at www.opensource.gov). They can search by a query (albeit complex queries), and they can limit results to a fixed set of very general topics (e.g., Conflict, Crime, Dissent, Environment, Human Rights). That is usually as complex as search gets; analysts must rely on their experience and intuition to understand the content and context of the results they receive. Clearly, embodiments of these methods and systems will significantly extend the search capabilities available to an analyst.

Alternative Embodiments to Enhance Collaboration

Alternative embodiments of these methods and systems will facilitate collaboration between and among users, focusing their attention on the mostly likely upcoming types of events, and enabling them to split a large problem into parts, share results, critique each others' ideas, etc. This would support decomposition of large projects into smaller tasks, the results of which could be shared.

FIG. 8 shows the top level use case of one embodiment of the predictor system 800 showing the high level functionality of the system. There are two types of users that invoke the functionality of the system. In this embodiment, the first type of user, User 1 810 is an analyst and the second type of user is an administrator 820. For the collaboration function, there are two analysts (810 and 830) working together. The embodiment shown in FIG. 8 describes the following functionality: Collaborate 851—contains the functions for analysts to collaborate on search results and the weightings of relevant topics; Search 852—contains the functions to perform a search of historical data to generate predictions: Log on 853—function for the user to identify themselves to the system; Manage User Environment 854—contains functions for the user to control how the system functions for them, such as setting user preferences; Manage Users 855—contains administrator functions to create and manage users; and Load Data 856—contains administrator functions to control the loading of data from external sources.

FIG. 9 shows the top level use case of one embodiment of the predictor system 900 showing the high level functionality that allows multiple users, such as user-1 910 and user-2 920 to collaborate and share system functionality across functions such as sharing a search 952, configuring 957 and viewing charts of results 958, modifying profiles 959 and providing and sharing assessments of the predictions. Examples of the additional functions capable in this and other embodiments include:

Collaborative knowledge refinement by topic probability modification: This capability will enable analysts to modify the probabilities of topics, and thus to explore the "prediction space" together more richly. Since dates are characterized essentially as vectors of probabilities on topics, modifying model-generated probabilities is a way to blend human and machine reasoning, as well as to enable collaboration among analysts. For example, if Nigeria had a soccer team in the World Cup during a contested election, that topic might be expected to have a major place in a ranked topic list, even though there is no logical causal relationship. A group of users working on a particular problem might recognize this potential confound, and they could zero out that topic and see if the list of predicted topics changed. (Note that this capability would also support powerful what-if analyses.)

Consensus collaborative knowledge refinement: An analyst could filter or modify results by including the likelihoods assessed for topics by other analysts.

Focused collaboration: By giving a ranked list of likely future topics, embodiments of this invention could focus the discussion of current events in very specific terms. This could be the "common reference" that is so necessary for shared understanding within a team.

Future PIRs: Priority Information Requests (PIRs) focus collaboration in intelligence brigades. Embodiments of this invention could spur future PIRs, that is, what information might it be useful to have in the future? This kind of preparation, seeking information before it's needed, could be a decisive factor if the kinds of events that embodiments of this invention predict do occur.

Overcome turnover and lack of experience: Newer analysts often lack the expertise required to relate historical evidence to current intelligence. Embodiments of this invention could help guide the search of novice analysts towards the most likely issues and the most similar historical circumstances to aid in their understanding of current events.

Historical collaborative calibration: As use with the system accumulates, one could look historically at how combined analyst predictions matched the actual topic mixture versus the model. Institutional knowledge is not routinely captured for reuse, except perhaps by long-term staff members, who integrate it in memory, thus increasing their expertise and the organization's reliance on them. Embodiments of this invention could both capture this institutional knowledge and could potentially learn what mix of automatic and human ratings could give the best prediction. Thus, embodiments of this invention could be used to store knowledge of experts, be calibrated by the knowledge of experts, and be used to supplement the knowledge of experts.

Testing of Embodiments of the System and Methods

The present invention is illustrated by, but by no means limited to, the following description of the testing of one embodiment. This embodiment was set up to test different latent variable methods and helps to further illustrate the operation of embodiments of the methods and systems disclosed.

Utilizing this embodiment of the methods disclosed and illustrated by FIG. 1, a study was conducted comparing the utility of three different latent variable methods (LSA, PLSA, and LDA) for Step 130.

Provide Data:

Referring to FIG. 1, the study was started by providing a historical data source, step 120, based on an archive of news from *The Jakarta Post*, whose archives from mid-1999 through the end of 2006 are available online, at the time of this test at:
http://www.thejakartapost.com/yesterday.asp. The Jakarta Post sorts articles into eight sections, which are listed in Table 1 along with the total article count available within the archive.

TABLE 1

Sections and article count from the Jakarta Post for Jun. 1, 1999 through Dec. 31, 2006.

| ID | Section | Total Article Count |
|---|---|---|
| 1 | National | 36,776 |
| 2 | City | 20,172 |
| 3 | Editorial | 14,205 |
| 4 | Business | 15,275 |
| 5 | Features | 17,556 |
| 6 | Sports | 5,785 |
| 7 | World | 1,075 |
| 8 | Supplement | 858 |

From this, two subsets of these data were focused on as shown in Table 2 along with the amount of training and testing articles available in each case. Note: For an article to be included, it was required to have at least 100 total words.

TABLE 2

The number of articles used for training and testing with four subsets of the Jakarta Post.

| Subset ID | Sections | Training 1 (2000-2003) 1350 days | Testing 1 (2004) 351 days | Training 2 (2000-2004) 1,701 days | Testing 2 (2005) 351 days |
|---|---|---|---|---|---|
| 1 | National | 12,802 | 4,049 | 16,851 | 4,271 |
| 12 | National, City | 18,851 | 5,642 | 24,493 | 5,572 |

Analyze Data with a Topic Model Technique:

As the first part of the analysis step 130, a few pre-processing transformations, step 132, were performed on the news data before using it for training and testing. Stop words (frequent words that convey little meaning, such as articles and conjunctions) were removed. These stop words came from a standard list that were found at the time of this test at ftp://ftp.cs.cornell.edu/pub/smart/english.stop.

De-pluralization was performed using part of the Porter stemming algorithm, with exceptions added (e.g., children→child, men→man, etc.). No other kinds of stemming were performed (e.g., reducing "bombing" to "bomb," or "education" and "educator" to "educat").

Words were tokenized (identified as distinct from one another) when separated by whitespace and/or any other non-letter character, with two exceptions: (a) Contractions (it's, we'll, etc.) were retained, and (b) hyphenated words were kept if there were letters (and not numbers) on both sides of the dash (hyphens removed, such that a word like "de-pluralize" would be changed to "depluralize").

All words were lower-cased to obtain a word ID, but the word form used in display is the first form found which is more likely to keep the proper capitalization for proper nouns. So if "Jakarta Post" appears in the text, then "Jakarta" will be properly capitalized, but the common noun "post" will be improperly capitalized. The latter case is rare though.

Since the techniques tested in this project are "bag-of-words" methods, that is, the order of the words, the syntax, is not examined, the original format did not need to be kept. Instead, the above tables were used to create three new tables for each subset of news sections:

1. Words: This table contains a word ID for each unique word remaining after post-processing.

2. Training: This table contains the frequency count of each word in each article from the training period. This is the "word×document" matrix used for the different latent variable techniques.

3. Testing: this table contains the frequency count of each word for each day in both the training and testing periods.

After acquiring the data and performing all the pre-processing, the different latent variable methods could be made on real-world data. No other features were used as input for the topic modeling of step 136.

The basic order of operations used for each algorithm being tested was as follows:

1. A training data range and a testing data range were specified.

2. Word IDs and document IDs were assigned for words and articles contained within the training data range. Articles had to have at least 100 words, and each word type had to occur a minimum number of instances in a minimum number of documents.

3. If removing words that appeared fewer than the minimum value produced articles with fewer than 100 words in the PLSA/LDA datasets, then these documents are also removed. This procedure was repeated until there were no further changes to the number of words or documents (usually, this required no more than two rounds).

4. For LSA and PLSA, a sparse matrix was created containing the count of every word type in every document if not zero. The Markov chain Monte Carlo sampling utilized in LDA requires cycling through every word token, not just the word types. So for LDA, two arrays were made: one containing the word ID for every token, and another containing the document ID of every token.

5. The three models were trained on the word×document (i.e., article) matrix. Articles tended to be about only a few topics and, therefore, allowed a proper semantic/topic space to be created.

a. LSA: The singular value decomposition was performed on the sparse word×document matrix to obtain the S largest singular values that were allowed by memory (for these data, about 1000 dimensions). This was done once, and then the k top dimensions were used for testing.

b. PLSA: Forty iterations of Expectation-Maximization (EM) were performed, and the perplexity was calculated. Each time the number of topics changed, EM had to be performed again, since the distribution of words to topics can change radically as topics are added. Pilot testing indicated that the perplexity decreased very little after 40 iterations.

c. LDA: Three chains of Markov chain Monte Carlo were run for 40 iterations each (in parallel) over every token in the training set, and the perplexity was calculated. As with PLSA, each time the number of topics changed, this training had to be re-run. The model (of the three chains) with the lowest perplexity was used for testing.

6. For testing, it was desired to compare testing days to training days. Therefore, the entire set of words from each day in the training date range was projected into k-dimensional semantic space (for LSA) or a k-topic space (for PLSA, LDA). The same was done for the days in the testing date range. Thus, every day was given a "topic profile."

7. For each day in the testing date range, the most similar D days in the training date range were found. For all methods, this similarity was based on the cosine similarity of the topic profiles between the two days. An average, weighted by the similarity, of the topic profile F days after each of the D days was used as the prediction. The values tested for D were: 8, 16, 32, and 64 matches. The values tested for F were: 1, 2, 4, 8, 16, 32 days ahead. In addition, more context was added to each day by including words from articles from the previous days; thus a day could be characterized by words (and thus topics) from B days, where B=1 (the day itself), 2, 4, or 8 days back.

8. The weighted average was then compared to the actual topic profile for that day. Three kinds of measures were taken: cosine similarity, the Spearman rank order correlation coefficient, and "top-ten," i.e., the proportion of the top ten dimensions/topics that were predicted that were actually present on that day (regardless of order). This was done for each testing day, and the average of each measure over all test days was outputted.

This testbed allowed an easy manipulation of the data and the models to investigate a variety of parameters, which will be discussed below.

Analyzing Data with Topic Model Techniques:

Referring again to FIG. 1 step 130, different methods are available by which to model the latent topics in the data. This study evaluated three different methods: Latent Semantic Analysis (LSA), Probabilistic Latent Semantic Analysis (PLSA) and Latent Dirichlet Allocation (LDA).

To conduct our empirical evaluation of LSA, PLSA, and LDA, the measures of performance needed to be equally valid across all models. The interest was in evaluating the interpretability and predictability of each model.

Interpretability of topics is a purely subjective measure, but it is, nevertheless, a critical test of the system's utility; users and/or administrators will need to be able to interpret the topics in order to make use of the system's output. Predictability is a measure of each model's ability to predict its own set of identified topics. Since the dimensions/topics derived from the three methods could be quite different and there was no "ground truth" against which to compare results, it was determined that predictability, internal consistency in a sense, would be the most important measure of model performance. Three kinds of measures of accuracy were taken to compare the predicted and actual topics on a test day: cosine between the topic vectors, the Spearman rank order correlation coefficient of the topics, and "top-ten," i.e., the proportion of the top ten dimensions/topics that were predicted that were actually present on that day (regardless of order).

To compute predictability, the modeled predictions were compared to those based on taking a random sample of D historical days to ensure that successful predictions were not simply a reflection of the same topics appearing over and over again. Our null hypothesis was that predictions based on the modeled similarity would be the same as the predictions based on a random sample of days. This null hypothesis can be rejected if the choice of days by the method gives a better prediction than a random set of days. One hundred such random samples were created for each change in the variables (k, D, F, B), for each model, the mean and standard deviation of the three kinds of measures of accuracy were individually assessed, and the Z-score ((value—mean)/standard deviation) obtained. By comparing the Z-scores between the methods it could be determined which method could predict itself most beyond chance, and thus demonstrate the most predictability.

In order to reduce the number of variable combinations to be tested, a pilot test was first conducted to determine both the best parameters and the feasibility of testing in certain conditions. A number of dimensions were identified along which to simplify our evaluation.

First, the number of conditions was considered that were intended to be run. Altogether, there could be 4 Matches*6 Days ahead*4 days Back*4 Subsets*6 Topic/dimension sizes*3 measures=6912 outcomes on which to find differences between the three methods. However, across all models and other variables, D=64 matches produced the best results, so analyses were focused on predictions calculated using this setting.

In our pilot testing, the cosine measure was consistently very high (>0.95) across conditions and methods, making it an ineffective differentiator. Note that the cosine similarity measure is dominated by the largest few dimensions. Day-to-day it may be that the same core topics are always present, e.g., the Indonesian government, the police, etc. The fact that the top-ten measure showed much more variability suggests that it is just a few of the dimensions that are more or less constant day-to-day. To capitalize on these differences, analyses were focused on the Spearman rank-order correlation coefficient and the top-ten measures.

Moreover, based on visual inspection of the top words in the topics, it appeared to us that at least 80 topics/dimensions would be required to capture the rich variety of news from the Jakarta Post. An investigation was limited to those conditions with 80 and 160 topics/dimensions.

Finally, in terms of how many days' worth of news to use to characterize the current and future news topics, it was found that one day's worth tended to show a large amount of variability and two days' worth was very similar to four days' worth. Hence it was decided to focus on model runs that used four and eight days. Because of the overlap in days, it is less meaningful to predict a day in the future which would contain news from the current day, so for example with B=4, June 1-4 could predict June 5-8, but it would not be helpful to predict June 2-5, since three of the days (June 2-4) are the same. Thus, it was decided to just look at F=8, 16, and 32 days ahead.

The conditions that were ended up being tested were as follows:
1 Match: 64
6 B-F combinations: 4-8, 4-16, 4-32; 8-8, 8-16, 8-32
2 Topic/dimension sizes: 80, 160
2 Subsets: National, City-National
2 Measures: Spearman, Top-ten This would allow us to calculate a total of 48 measures on which the three methods could differ.

Profiling Topics Over Dimension:

Referring to FIG. 1, step 130, the models were trained on four years of articles from Jan. 1, 2000 to Dec. 31, 2003. The models were then tested on one year of articles: Jan. 1, 2004 through Dec. 31, 2004. This is a difficult test since it could be that new topics occur over the year or that topic-sequence tendencies change over the course of the year (which would tend to reduce the fit of the trained models to test data).

Referring to FIG. 1, step 140, profiles for each day (composed of 4 or 8 days' worth of data) were determined using the topic model.

Predict Topic Activity Over Dimension:

Referring to FIG. 1 step 150 each topic model was used to make a prediction via the matching method described above. The predicted set of topics and the actual set of topics derived using the same model were compared to those topics predicted from a random set of historical days.

Figure 10:
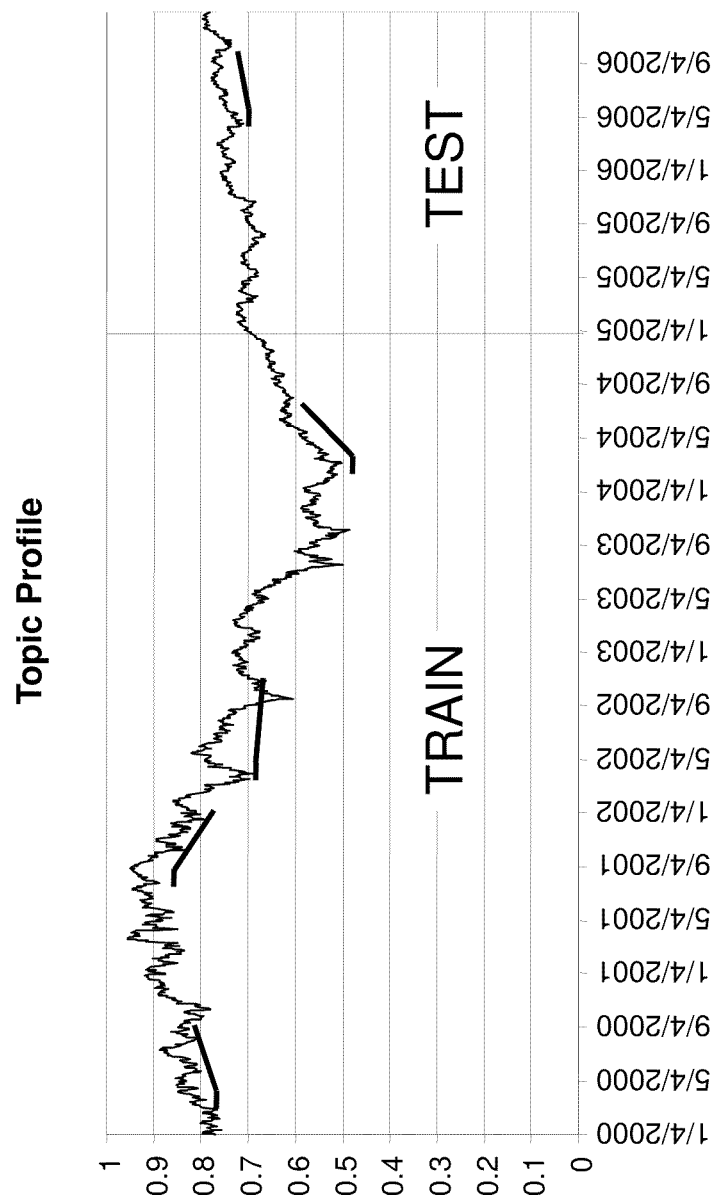
FIG. 10 illustrates one embodiment of testing the prediction of topic values.

(FIG. 10 illustrates one method for testing the prediction of topic activities. In this embodiment, for a given day in the test period (May 4, 2006), we find the D=4 most similar days in the past time (training) period using one of the three latent variable methods and all topics. We predict that 90 days after May 4, 2006, this topic would have a value equal to the weighted average of this topic F=90 days ahead after each of those matches.)

Figure 11:
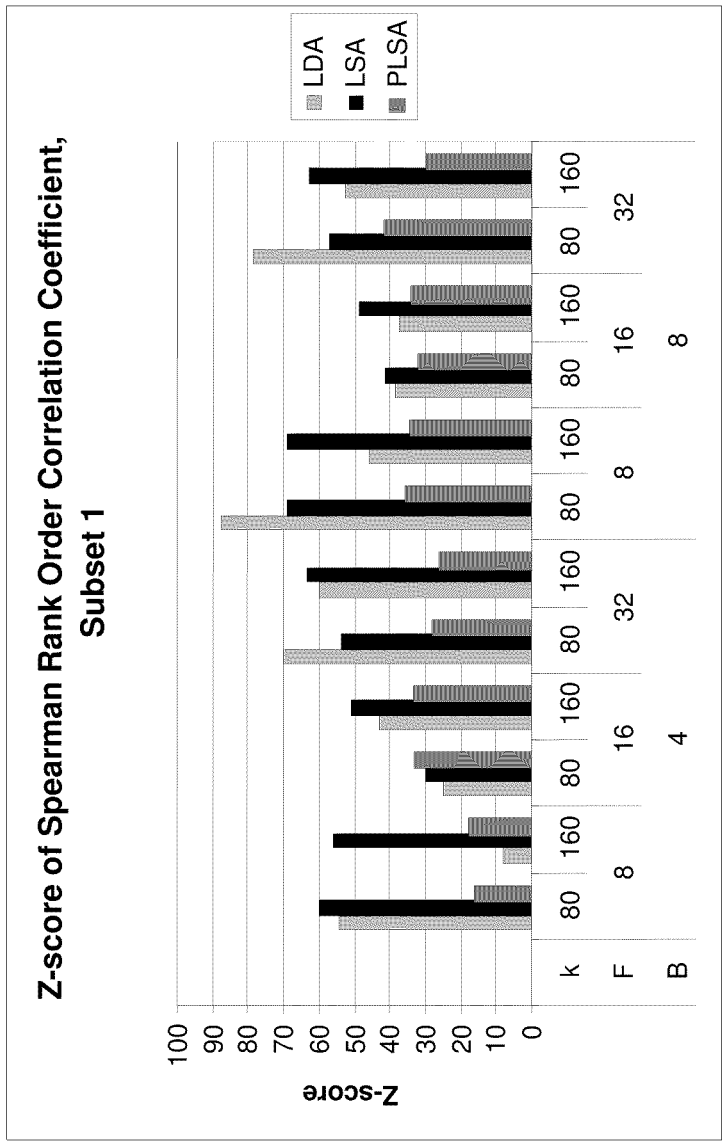
FIG. 11 illustrates a graphical representation of Z-scores on the Spearman rank order correlation coefficient for Subset 1.

FIG. 11 shows Z-scores on the Spearman rank order correlation coefficient for Subset 1. There are a number of items of note in these data. First and foremost, the data contain extremely high values for Z-scores. A Z-score greater than 3.09 implies a probability of less than 0.001. This Z-score was exceeded with every method in nearly every case. Depending on the specific conditions, one method did perform better than another, however. For example, in FIG. 11, LSA performed best looking at B=4 days back and F=8 days ahead, but PLSA performed best at 16 days ahead, and LDA performed best (but only with k=80) at 32 days ahead. These differences aside, it was clear that each method probably provided the requisite predictability required.

Figure 12:
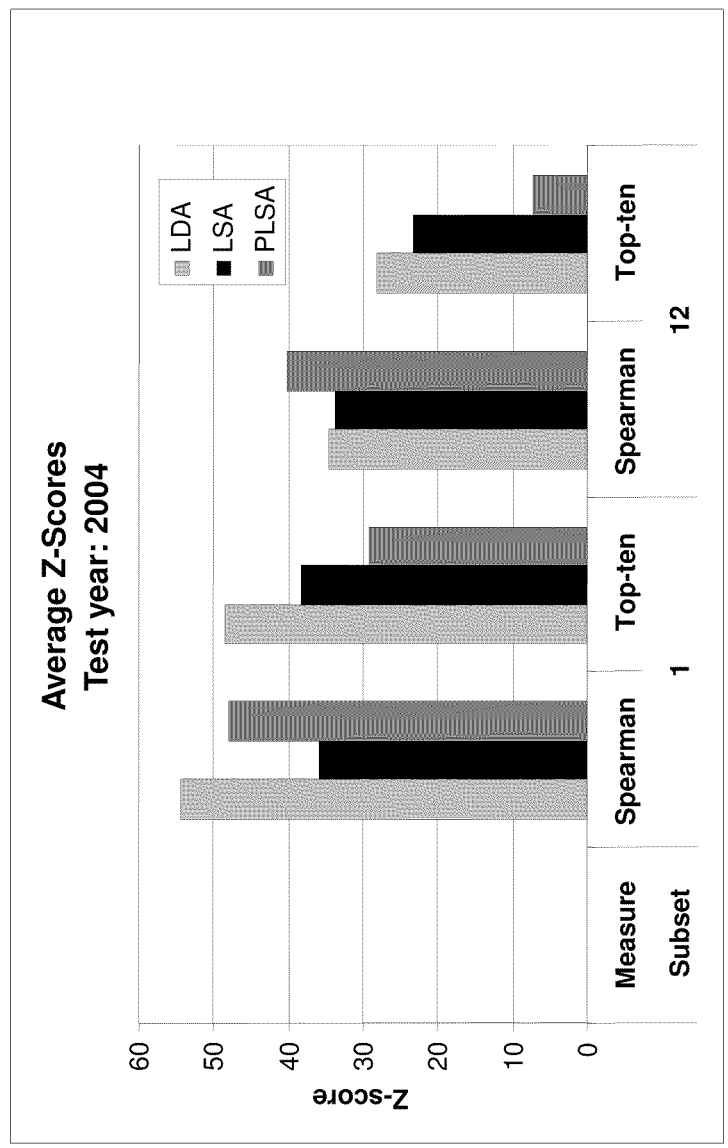
FIG. 12 illustrates a graphical representation of Average Z-scores for the three methods with two different measures on two different subsets of the data.

Overall results are summarized in FIG. 12 which shows the averaged Z-scores across k, F, and B for the two kinds of measures and the two subsets. It is clearer in FIG. 12 that the larger set of data in Subset 12 did make the task more difficult. The Top-ten measure also appears to be more sensitive to this change.

As FIG. 12 indicates, LDA appears to perform slightly better overall. However, it was concluded that each method probably has the capacity to make predictions of the rank of topics in future days by finding similar days to those in the past.

Testing Results of One Embodiment

As discussed above, there was an interest in evaluating the interpretability of the topics identified by the models. For PLSA and LDA, a common practice is to examine the top 10-20 most probable words in each topic in order to determine the nature of the topics, or latent concepts, that these methods find in the data. This is less common in LSA studies, for which the dimensions do not themselves have meaning irrespective of the higher ranked dimensions. Typically, a second step is performed to generate some kind of clustering of the words within the semantic space (e.g., Bellegarda, 1998, 2005); this was not attempted here. In general however, LSA topics convey which sets of words carry the most variance. The weight of a word can even have a negative sign, indicating that the presence of that word puts it in the "opposite" semantic space as words with a positive sign.

In the three tables below, the topics that contained the words "bomb" or "protest" in their top twenty words were extracted from the top 80 dimensions of LSA, and from 80-topic models for LDA and PLSA. In Table 3 below, it can be seen in Topic 12 of the LSA model both "bomb" and "protest," but they have opposite signs. The negatively signed words deal with workers, labor, and students protesting rights with the police; whereas the positively signed words may have to do with a bombing in Bali. In Topic 33, the negatively signed words are vaguely along the lines of government elections and meetings; whereas the positively signed words have to do with bombs in the Maluku province.

TABLE 3

Topics from the top 80 topics of an LSA model from National news with the words "bomb" or "protest."

| Topic 12<br>"Protest" +<br>"Bali Bombing" | Topic 33<br>"Gov't elections" +<br>"Maluku bombs" |
|---|---|
| worker | meeting |
| Jakarta | government |
| labor | leader |
| People | General |
| student | Maluku |
| State | Province |
| chairman | Public |
| Bali | Abdurrahman |
| House | country |
| right | Indonesian |
| Indonesian | office |
| Bombing | Megawati |
| Military | Commission |
| protest | Election |
| Police | island |
| company | health |
| Indonesia | Police |
| organization | foreign |
| Regional | bomb |
| Regency | bill |

In Table 4 below are the two topics from an 80-topic LDA model that had the word "bomb" or "protest". (Unlike LSA, the order of the topics as given by the topic number has no relation to its prevalence in the data.) Topic 29 is clearly about the bombing in Denpasar, Bali set by two suspects: Amrozi and Samudra. Topic 45 is a more general topic about student protests, rallies, strikes and demonstrations.

TABLE 4

Topics from an 80-topic LDA model from National news with the words "bomb" or "protest."

| Topic 29 "Bali Bombing" | Topic 45 "protest" |
|---|---|
| Bali | Protest |
| Bombing | Student |
| Bomb | Rally |
| Suspect | protester |
| Police | Demand |
| Blast | Jakarta |
| Attack | City |
| Amrozi | demonstration |
| Explosive | Strike |
| Samudra | Front |
| Killed | building |
| Alia | Street |
| Oct | Activist |
| Denpasar | People |
| Explosion | Hundred |
| People | Capital |
| Imam | Staged |
| Ali | demanded |
| Investigator | Office |
| Christmas | demanding |

In Table 5 below are the three topics from an 80-topic PLSA model that contained the words "bomb" or "protest." Topic 13 is a general topic about police investigations of bombs, blasts, and other explosions. Topic 69 is like LDA's Topic 29 concerning the specific bombing in Bali which was in the news so much. Similarly, Topic 51 is like LDA's topic 45 concerning student protests and demonstrations.

Each method appeared to find a general protest topic. Each method also found a topic specific to the bombing in Bali in October 2002. Only PLSA was able to pull apart two topics related to bombing: the specific one and one general about police investigations of bombings and explosives. In terms of prediction, it is unlikely that the bombing in Bali will occur again, thus one would like to see topics that are topical, but not so specific that they refer to a particular instance which is unlikely to be repeated. It is clear that the topics found by LDA and PLSA are very easy to interpret. While further ad hoc processing could be done to cluster words better in LSA than just looking at the topics carrying variability, this kind of process is inherent and fundamental to the processing behind LDA and PLSA. Given that all three have sufficient predictability, it appears that statistical models such PLSA and LDA will be the most useful since the resulting topics are more easily interpretable.

TABLE 5

Topics from an 80-topic PLSA model from National news with the words "bomb" or "protest".

| Topic 13 "bomb investigations" | Topic 69 "Bali bombing" | Topic 51 "protest" |
|---|---|---|
| Police | Bali | Protest |
| suspect | Amrozi | Student |
| Bomb | Bombing | Protester |
| Bombing | Samudra | Rally |
| Attack | Denpasar | People |
| Blast | Ali | Office |
| investigation | Imam | demonstration |
| Explosive | Death | Demand |
| Team | Oct | Local |
| Chief | People | Staged |
| People | Imron | Central |
| Arrested | Attack | Java |
| investigator | Kuta | Demonstrator |
| Gen | Club | building |
| Found | Mukhla | Hundred |
| Explosion | Alias | demanding |
| Jakarta | Brother | front |
| National | Killed | activist |
| Killed | Victim | Jakarta |
| Evidence | Blast | demanded |

Testing of Another Embodiment of the Systems and Methods

The present invention is illustrated by, but by no means limited to, the following description of the testing of one other embodiment. This embodiment was created to test the ability of latent variable methods for predicting an exogenous variable, and helps to further illustrate the operation of embodiments of the methods and systems disclosed.

The goal of this embodiment was to combine these topic extraction techniques, which turn text into vectors of numbers changing over time, with other information that also changes over time. By making a link between text written about the world with activities in that world, we can begin to understand both how the text reflects those real-world activities, as well as how the text can anticipate or perhaps even cause those activities.

To investigate this idea, we took both a textual data source and a real-world time series to which the text might be related. To this end, we decided to use Time magazine data. These data begin in 1923, so we had to find an appropriate time series that would both be related to what was discussed in Time, as well as go back that far in history. It seemed that economic data would be related to topics being discussed in the Nation and Business sections of Time, so what economic data go back that far? We explored the Dow Jones Industrial Average which has been in its current state of 30 stocks since 1928. With these textual and economic data we determine how well we might predict real-world time series with textual data.

The text itself is an issue however, especially over such a long course of time. Politicians are voted in and out (or die), wars and disasters rock the country, and companies are launched and go bankrupt. The normal method for creating topics, where we want to know what is being discussed in the article, the gist of it, is not what we want here. There will be no (or little relation) between a Roosevelt topic being active in the 1930s and in the 2000s, except perhaps in the sense of historical reference. In a sense, we don't care what particular politician is being discussed, or what company went bankrupt. However, it may be the case that how these topics are being discussed in Time, the adjectives used to describe these nouns, may be revealing of the zeitgeist, of the tenor, of the valence of the times.

In general this is called sentiment analysis where techniques, often statistical ones like those used here, are used to determine if the reviews of a movie or a new product are more generally positive or negative, or even how the language in reviews of a product can affect its sales price. However, the large scale source of the text (the entire nation being reported by Time), the large scale economic effects being forecast, and the temporal dynamics are unique.

The first issue of Time magazine was in Mar. 3, 1923. Started by Henry Luce and Britton Haden, it was the first weekly news magazine in the United States and has been published weekly ever since. The archives of Time magazine are available at http://www.time.com/time/archive. Every week's magazine articles (thus not including more recent online-only articles) up through Apr. 28, 2008 were downloaded and placed in a database with extracted metadata information including date, author, and section. Only articles from the "Nation" (concerning mostly U.S. politics) and "Business" (concerning mostly U.S. companies and economics, but also world economic news) were included for analysis. It was felt that these two types of articles would be most reflective and predictive of economic data. However, we did not investigate them independently.

Given that the text source is dated from 1923, we sought continuous economic data that also went back that far. The Dow Jones Industrial Average (DJIA) is a price-weighted index of the 30 largest and most widely held public companies in the United States. While started in 1896 by Wall Street Journal editor Charles Dow and his business associate Edward Jones with 12 stocks, the index increased to 30 stocks in October 1928, for which a continuous record is available (obtained from http://finance.yahoo.com/q/hp?s=^DJI).

All the words and collocations extracted in Time itself would naturally be the place to start. However, the topics created using all these words would be too topical—generally concerned with specific people (e.g., Kennedy, Bush), corporations (e.g., Standard Oil, Microsoft), and events (World War II, the Lewinsky Scandal). Therefore, the goal was to find those words that would be more diverse in the usage across time (and Time), and connote positive or negative aspects of the people, corporations, and events being described. We started with a set of 19 "seed" word pairs with clear valence, such as "good/bad," "rising/falling," "healthy/sick," etc. These words were submitted to Roget's 21$^{st}$ Century Thesaurus online (http://thesaurus.reference.com). All the adjectival synonyms and antonyms were collected and a distinct list created with approximately equal positive and negative terms. The more ambiguous terms (e.g., "novel," "prize") were removed. In the end, this resulted in a list of 2,977 words of which 2,467 were found in the data in a minimum of 5 different articles. The top 20 words by order of article count are in Table 6 below.

TABLE 6

Top 20 Valence Words by Article Count

| Rank | Word | Count |
| --- | --- | --- |
| 1 | biggest | 9429 |
| 2 | possible | 7922 |
| 3 | largest | 7340 |
| 4 | strong | 6789 |
| 5 | serious | 5729 |
| 6 | growing | 5467 |
| 7 | huge | 5441 |
| 8 | fast | 4838 |
| 9 | leading | 4764 |
| 10 | rising | 4346 |
| 11 | tough | 4222 |
| 12 | difficult | 4221 |

TABLE 6-continued

Top 20 Valence Words by Article Count

| Rank | Word | Count |
| --- | --- | --- |
| 13 | powerful | 4154 |
| 14 | successful | 4133 |
| 15 | greatest | 3789 |
| 16 | effective | 3740 |
| 17 | potential | 3683 |
| 18 | easy | 3656 |
| 19 | rich | 3551 |
| 20 | worst | 3355 |

We used Probabilistic Latent Semantic Analysis (PLSA; Hoffman, 1999) as the latent variable method to statistically derive the groups of terms which would convey a certain valence or positive/negative affect, to an article. Since the English language changes slowly (except for nouns which we exclude), the Valence Words should have similar meanings which span across time (or at least the 20$^{th}$ Century) and so the Valence Topics.

Due to the use of a fixed list of words, no pre-processing of the text was done. Simple counts of the Valence Words in each article were obtained. If an article contained at least two of the words it was kept. Only words that appeared in at least 5 different articles were kept, leaving 50,334 of the original 76,464 articles.

PLSA was run on this word X document matrix using 6 topics. This number was chosen with the view that there were generally three types of adjectives in the Valence Words with positive and negative aspects of these types. The three types were roughly along the lines of: 1) creative/growing vs. destructive/shrinking; 2) good/successful vs. bad/unsuccessful; and 3) big/fast vs. small/slow. However, as the results show, these topics are not exactly those that were pulled out statistically.

To characterize the topics for each week, the mean of the topic distributions assigned to the articles from that week and the three previous weeks were used. This created a relatively smoother time series of topic activity.

The data for Time magazine are weekly, the DJIA daily. To get economic data for each week of textual data, the closest value in time was used. More critically, it was assumed that the absolute values of the economic data could not be predicted across such a wide span of time. The DJIA has changed by a factor of over 100. Therefore, what was predicted was the change in these values: specifically, the log 10 of the ratio of the value to the value 6 months (26 weeks) previous (referred to as "log 6m delta" or just "6m delta"). The six month period was decided because it is just far enough in the future that it would be difficult to predict (and the results will show this), but just near enough that what is happening today might have an influence (and the results will show this as well).

Cross-correlation does a correlation of one time series against another, but at different leads and lags of one of the series. In the results presented here, we are most interested in the influence of Valence Topics on the economic time series. There are two questions we are interested in that cross-correlation can answer. First, if activity on a topic is high, is that reflecting changes in the economics that have already occurred, or can it anticipate changes that will occur? Second, if the activity in a topic has changed (i.e., the log 6m delta), is that concomitant with changes in the economics, or can that anticipate changes that will occur? Note that all the correlations shown in the results are quite low, less than 0.2, though many are still significant due to the thousands of data points from the decades of data. The point here will be to show that performing the text analysis described above completely independent of its intended use (to predict economic variables) still yields significant results.

The purpose of this experiment of using Time magazine to predict economic variables in the United States was to show a proof of concept of linking the methods of this invention with other variables related to the real world. Eventually, we do not want to just show that there is a link between the text and the economic variables, but that using this information can be useful, and more useful than not using it. Therefore, we needed a baseline to compare against. A standard baseline method is to use the naïve assumption that tomorrow will be like today. In the case here, this assumption means that if DJIA has dropped 10% since six months ago, then six months from today it will drop another 10%.

Since the values we are attempting to estimate are themselves changes, then we can also make shorter term predictions. If today the DJIA 6m delta shows a 10% drop, then this change is also our naïve prediction for next month's DJIA 6m delta, except that this prediction would be the change from 5 months ago (which we know) to 1 month from now (which we are predicting). Thus, given the current 10% drop from six months ago, we would predict that 1 month from now DJIA will be 10% below what it was five months ago.

These baseline, naïve predictions, work surprisingly well, as will be shown in the results. The question is whether they can be improved upon by using information from a completely different domain: activity and changes in activity in the Valence Topics. Therefore, the "model" predictions will include the naïve prediction as a factor in addition to the topic and delta topic activities. The basic hypothesis is that the additional information will improve the predictions.

Predictions in this report use a simple linear model (the "lm" function from the statistics package R) which does an ordinary least squares fit of the data. Time series forecasting is a complex field of endeavor, so the results presented here should be taken as a proof of concept and not for the best possible model for forecasting. Note that this technique of making predictions is along the lines of the AFIMA models, and not the topic similarity models.

Below we present the results of the testing along a number of aspects. First, we examine the Valence Topics themselves to see how well they correspond to the general dimensions assumed in the Valence Words. Second, we examine the time series of the topics themselves to note any obvious patterns. Third, we explore the cross-correlations to see how topic activity and changes in topic activity reflect and forecast changes in economic variables. Finally, we explore the ability of a simple linear model using Valence Topics to better predict the economic variables over the Baseline model.

Table 7 below shows the top 10 most probable words in the six topics. As a mnemonic, labels can be applied to the topics in order to capture the gist of the meaning. Topic 0 and Topic 5 are mostly concerned with "growth" with terms like: biggest, growing, rising, etc. Because of terms like potential and possible, Topic 0 has been labeled Future Growth, leaving Topic 5 as Current Growth. Topic 1 is clearly referring to Bad Times with terms like worst, broken, and desperate. Topic 2 is clearly concerned with Strength with terms like strong, effective, and powerful. Topic 3 is a bit of a mixture with terms like happy and successful, but also serious, worried and angry, but on balance it seems to concern mostly Weakness. Finally, Topic 4 contains adjectives more appropriate to people (responsible, handsome) most of which are Positive People.

TABLE 7

Valence Topics from Time Magazine

| Topic 0 Future Growth | Topic 1 Bad Times | Topic 2 Strength | Topic 3 Weakness (mostly) | Topic 4 Positive People | Topic 5 Current Growth |
|---|---|---|---|---|---|
| biggest | Worst | strong | possible | serious | largest |
| growing | Broken | leading | serious | solid | biggest |
| fast | Highest | complex | happy | responsible | rich |
| giant | Ill | effective | successful | obvious | rising |
| vast | Honest | principal | worried | effective | huge |
| potential | Desperate | plenty | significant | handsome | greatest |
| possible | Tough | tough | angry | winner | profitable |
| unable | Lucky | limited | potential | distinguished | steady |
| losing | Possible | mere | difficult | powerful | sharp |
| huge | Suffering | powerful | weak | extraordinary | proud |

Figure 13:
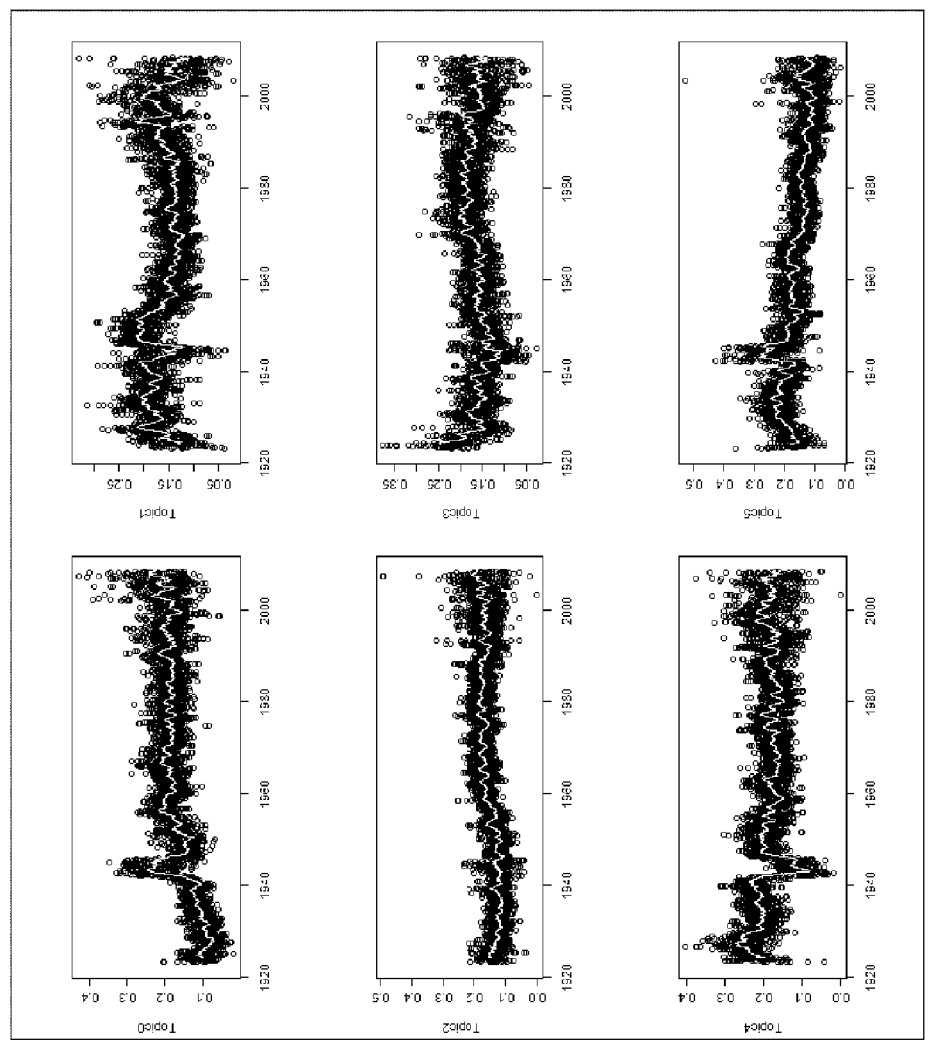
FIG. 13 illustrates one embodiment of a graphical representation of Time series of Valence Topics from Time Magazine, 1923-2008.

The time series of the six topics are presented in the FIG. 13. The circles represent the probability or activity of that topic on that day. The light green line is a 52-week moving average. A number of qualitative observations can be made which should be pursued in further work.

First, from the mid-1950s to the mid-1980s, there is very little variability in any of the topics. This was a time of relatively calm economic activity. There are some slight changes in the early 1970s (Bad Times (Topic 1) and Weakness (Topic 3) both show steep increases, and Current Growth (Topic 5) shows a drop), but compared to the times before and after this there is very little variability—a Golden Age.

The time around World War II (~1940-~1945) is markedly different. Future Growth (Topic 0) and Current Growth (Topic 5) show marked increases in activity—probably due to discussion not of economics but of the war and war effort (though this is what pulled the United States out of the Great Depression). There is also a steady decline during the early 1940s in activity in Bad Times (Topic 1), though it appears to spike at the end and stay high through about 1950. Positive People is also dramatically less during World War II.

Another aspect of these graphs worth investigating is the similarity of the Valence Topics during asset bubbles and recessions. As an example, one can look at the activities from 1923 to 1929 and compare those to 1994 to 2000. In both cases, activity in Future Growth (Topic0) is decreasing, Bad Times (Topic1) is increasing; discussion of Weakness (Topic3) makes a large drop; and Positive People (Topic4) rises greatly. Detailed analyses of these trends and similar behavior before and during other economic recessions are left to future work.

Figure 14:
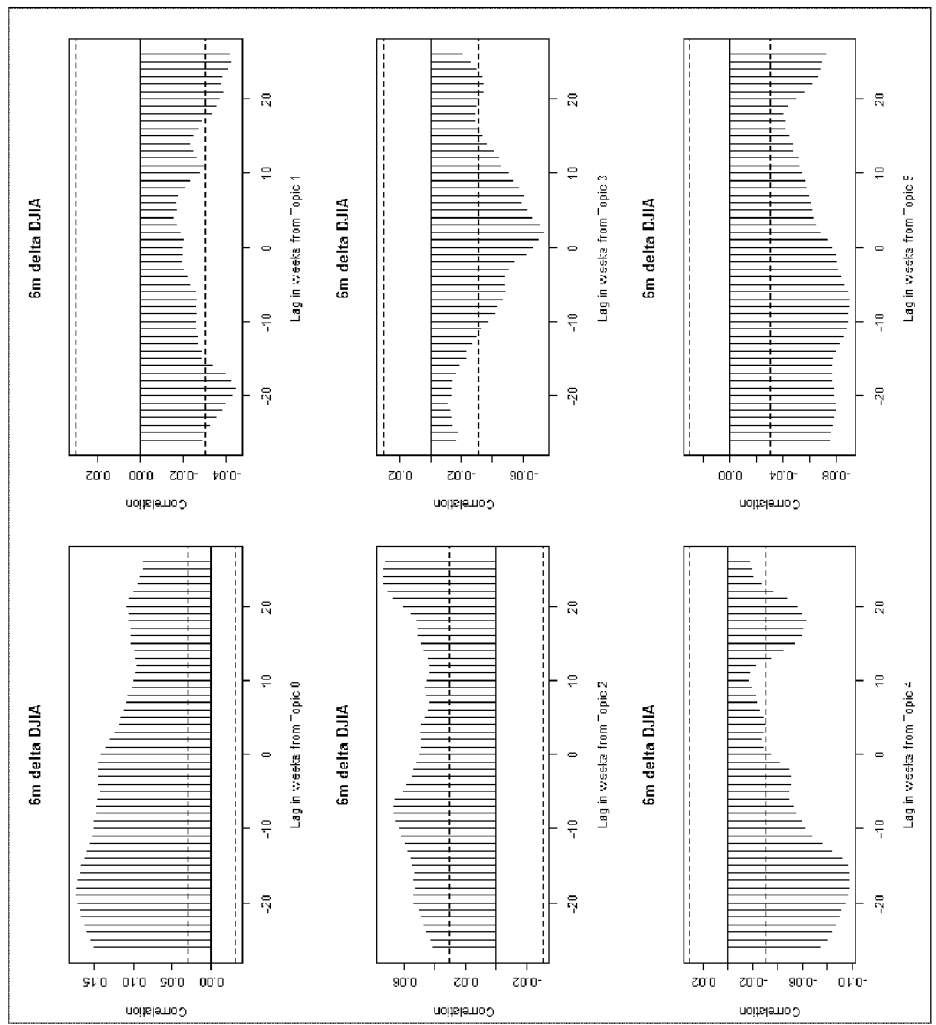
FIG. 14 illustrates one embodiment of a graphical representation of Cross-correlation of Valence Topics with six-month change in the Dow Jones Industrial Average.

The first test of the hypothesis is that Valence Topics are indicative of current, and perhaps future, economic activity. The chart in FIG. 14 show the cross correlation between each of the Valence Topics and the DJIA. We would expect that Bad Times (Topic 1) and Weakness (Topic 3) would be negatively correlated with the economic variables. Similarly, Strength (Topic 2) should be positively correlated. However, Positive People (Topic 4), Future Growth (Topic 0) and Current Growth (Topic 5) could all conceivably go either way: these things are reported because they are out of the ordinary and "news", or things are going so well, everything to be reported is positive.

FIG. 14 shows the cross correlation of Valence Topics with the 6m delta DJIA data. It is clear that the obvious topics do correlate in the expected direction: Topics 1 and 3 are negative and Topic 2 is positive. Looking at Future Growth (Topic 0), we see that there is a general positive correlation. That is, the more discussion there is of Future Growth, the more the DJIA has already gone up. Current Growth (Topic 5) is the opposite, but there may be a confound here since, as seen in FIG. 13, the absolute level of Topic 5 has dropped steadily since the 1950s (while the economy has general improved) which may reflect a stylistic change more than anything.

Figure 15:
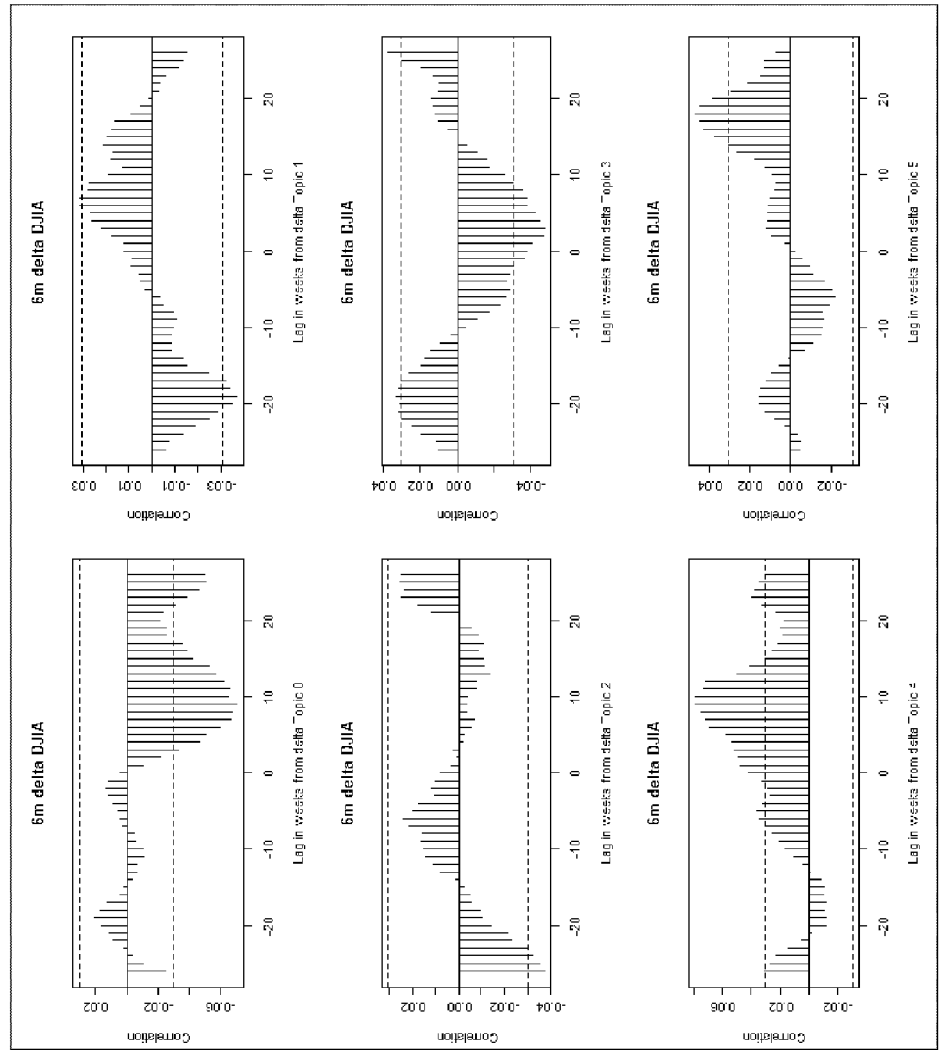
FIG. 15 illustrates one embodiment of a graphical representation of Cross-correlation of six-month change in Valence Topics with the six-month change in Dow Jones Industrial Average.

Another way to look at the data is at the cross-correlation in changes in the topic activities with the 6m delta DJIA. That is, if activity in a topic has risen over the last 6 months, is that correlated also with a rise in the DJIA (See FIG. 15). Only Weakness (Topic 3) shows a significant correlation at Lag 0 indicating that if discussion of weakness has dropped, then the DJIA has risen. All Valence Topics except Strength (Topic 3) also show significant (if small) correlations at positive lags. These indicate that the current change in that Valence Topic from six months before is correlated with a change in the 6m delta DJIA over the next (lag) weeks. So, for example, the more activity in Positive People (Topic 4) has risen from the activity 6 months previous, then the higher the 6m delta DJIA will be in 10 weeks, i.e., the more the DJIA will be higher in 10 weeks than it was 16 weeks before (since 6 months~26 weeks).

The cross-correlation analysis indicates that there are significant, if small, correlations between the activity levels, and changes in those levels, between the Valence Topics and changes in economic activity. The question now is whether or not these correlations can be used to improve predictions of those changes in economic activity.

The first step in understanding if the Valence Topics improve estimates of economic change is to examine models using all the data available. Table 8 shows the performance of the Baseline (naïve) model and the naïve model plus Valence Topic data. For the Topic Model, we used the values of the topic activity and delta topic activity at lags of 6, 9, 13, 18, and 26 weeks. At each value of Weeks Ahead, we used Topic data only from that lag or greater to make an estimate. For the Baseline model, we used only the value at that particular lag.

From Table 8 we see that as we try to forecast further into the future, the $R^2$ decreases (though does stay significant with p-values extremely low) and residual standard error increases. Nevertheless, adding Valence Topic information does improve the results. At 26 weeks (six months), the Topic Model improves the $R^2$ by 250%.

TABLE 8

Baseline Model (upper) and Topic Model (lower) overall forecasting performance

| Weeks Ahead | Overall Adjusted $R^2$ by Model Type | | Overall Residual Standard Error by Model Type | |
|---|---|---|---|---|
| | Baseline | Topic | Baseline | Topic |
| 6 | 0.6032 | 0.6167 | 0.03678 | 0.03616 |
| 13 | 0.2999 | 0.3229 | 0.04887 | 0.04806 |
| 18 | 0.1601 | 0.1883 | 0.05354 | 0.05262 |
| 26 | 0.02067 | 0.05521 | 0.0578 | 0.05677 |

Next, we tested if the forecasts of the Baseline model could be improved by adding the Valence Topics. For this, we started with five years of data (260 weeks) and then for each subsequent week, made a prediction six months (26 weeks) in advance. We also segregated the data based on how large the change actually was. Two measures were taken: the mean absolute error (MAE) of the actual change and the predicted change, and the percent correct, i.e., the sign of the change since this may be more critical than how big a change one sees.

TABLE 9

Forecasting the 6m delta DJIA six months in advance

| Minimum Absolute Value of Actual Change | Percent Correct by Model Type | | Mean Absolute Error by Model Type | |
|---|---|---|---|---|
| | Baseline | Topic | Baseline | Topic |
| 0 | 58.34% | 62.17% | 0.03864 | 0.03838 |
| 0.025 | 59.13% | 62.90% | 0.054569 | 0.05079 |
| 0.05 | 56.89% | 62.72% | 0.07444 | 0.06944 |

Overall, as the actual change increases, the error for both models also increases. The Topic Model does better in all cases though, and as the actual changes increase, its performance over the Baseline model increases, indicating that it is better at forecasting the larger changes, which are arguably more important. However, shorter range forecasts (e.g., 1 or 3 months) should be investigated to see if those can more be accurate temporally.

The results described above suggest that the methods of this embodiment can be used to predict real-world values of significant meaning and worth.

This invention is not limited to the methods and systems described in the embodiments above. The methods of this invention are easily incorporated into computer systems and data networks that allow certain steps of these methods, such as input and output, to be performed on client machines connected to a computer network while the computational steps and data set storage can be done through a server in a client-server model or other distributed computing architecture. It is also envisioned that the methods can be used over a wireless computer network to include wireless computers, wireless phones or other wireless data network.

It is understood that computer programs implementing the methods of this invention will commonly be distributed to users on a distribution medium such as floppy disk or CD-ROM. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

With respect to the above description then, it is to be realized that the optimum relationships for the steps and components of this invention, to include variations in providing and acquiring data, pre-processing data, analyzing data, predicting results and displaying results are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although this invention has been described in the above forms with a certain degree of particularity, it is understood that the present disclosure has been made only by way of example and numerous changes in the details of construction and combination and arrangement of parts may be resorted to without departing from the spirit and scope of the invention.

What is claimed is:

1. A computer based system for predicting a data value, said system comprising:
   a processor capable of executing machine instructions;
   the machine instructions including a means for predicting a predicted data value of a first data set at a predicted dimension value utilizing a focus topic profile and a means for analyzing a second data set using a latent variable method;
   the latent variable method using at least one focus feature from a third data set to create at least one focus topic from the second data set; and
   the focus topic profile comprises at least one focus topic value of the at least one focus topic from the second data set.

2. The computer based system of claim 1 wherein the focus topic is a valence topic.

3. The computer based system of claim 1 wherein the means for predicting the predicted data value comprises using a predictive model of a temporal relationship of the focus topic profile and the first data set.

4. The computer based system of claim 1 wherein the means for predicting the predicted data value comprises using a time series analysis model of a temporal relationship of the focus topic profile and the first data set.

5. The computer based system of claim 1 wherein the first data set comprises financial data.

6. The computer based system of claim 1 wherein the wherein the focus topic profile comprises a focus topic profile of news data.

7. A computer based system for predicting a data value, said system comprising:
   a processor capable of executing machine instructions;
   the machine instructions including a means for predicting a predicted data value of a first data set at a predicted dimension value utilizing a focus topic profile; and the means for predicting the predicted data value further comprises a modeling package capable of:
   receiving a base dimension value having a base focus topic value;
   receiving a predicted dimension value having a difference dimension value from the base dimension value;
   analyzing the focus topic profile over at least one dimension value to identify a most similar focus topic value to the base focus topic value;
   the dimension value at the most similar focus topic value being a selected dimension value; and
   selecting at least one data value from the first data set at the difference dimension value from the selected dimension value as the predicted data value at the predicted dimension value.

8. The computer based system of claim 7 further comprising:
   a means for analyzing a second data set using a latent variable method using at least one focus topic; and
   the focus topic profile comprises at least one focus topic value of the at least one focus topic from the second data set.

9. The computer based system of claim 7 wherein the first data set comprises financial data related to the focus topic profile over a dimension including at least the selected dimension value.

10. The computer based system of claim 7 wherein the wherein the focus topic profile comprises a focus topic profile of news data related to the first data set over a dimension including at least the selected dimension value.

11. The computer based system of claim 7 wherein the focus topic is a valence topic.

12. A computer based system for predicting a data value, said system comprising:
   a processor capable of executing machine instructions on a first set of data comprising financial data; and
   the machine instructions including a means for transforming a second set of data over at least one dimension value to create a topic profile and a means for predicting a predicted data value of the first set of data at a predicted dimension value; and
   the means for predicting the predicted data value of the first set of data further comprises a modeling package capable of:
   receiving a base dimension value having a base topic value;
   receiving the predicted dimension value having a different dimension value from the base dimension value;
   analyzing the topic profile over the at least one dimension value to identify a most similar topic value to the base topic value;
   the dimension value at the most similar topic value being a selected dimension value; and
   selecting at least one data value from the first data set at the difference dimension value from the selected dimension value as the predicted data value at the predicted dimension value.

13. The computer based system of claim 12 wherein the financial data comprises a function of a Dow Jones Industrial Average.

14. The computer based system of claim 12 wherein:
   the means for transforming the second set of data further comprises analyzing the second set of data using a latent variable method to create at least one topic; and
   the topic profile comprises at least one topic value of the at least one topic.

15. The computer based system of claim 12 wherein:
   the means for transforming the second set of data further comprises analyzing the second set of data using latent Dirichlet allocation to create at least one topic; and
   the topic profile comprises at least one topic value of the at least one topic.

16. The computer based system of claim 12 wherein the means for predicting the predicted data value of the first set of data comprises using a predictive model of the topic profile.

17. The computer based system of claim 12 wherein the means for predicting the predicted data value of the first set of data comprises using a time series analysis model of a temporal relationship of the topic profile and the first data set.

18. The computer based system of claim 12 wherein the first data set is related to the topic profile.

19. The computer based system of claim 12 wherein the wherein the topic profile comprises a topic profile of news data related to the first data set over a dimension including at least the selected dimension value.

20. The computer based system of claim 12 wherein the topic is a valence topic.

21. A method for predicting a data value, said method comprising:
   receiving a first data set;
   predicting a predicted data value of the first data set at a predicted dimension value utilizing a focus topic profile;
   analyzing a second set of data using a latent variable method;
   the latent variable method using at least one focus feature from a third data set to create at least one focus topic from the second data set; and the focus topic profile comprises at least one focus topic value of the at least one focus topic from the second set of data.

22. The method of claim 21 wherein the focus topic is a valence topic.

23. The method of claim 21 wherein the step of predicting the predicted data value comprises using a predictive model of a temporal relationship of the focus topic profile and the first data set.

24. The method of claim 21 wherein the step of predicting the predicted data value comprises using a time series analysis model of a temporal relationship of the focus topic profile and the first data set.

25. The method of claim 21 wherein the first data set comprises financial data.

26. The method of claim 21 wherein the wherein the focus topic profile comprises a focus topic profile of news data.

27. A method for predicting a data value, said method comprising;
  receiving a first data set;
  receiving a base dimension value having a base focus topic value;
  receiving a predicted dimension value having a difference dimension value from the base dimension value;
  analyzing a focus topic profile over at least one dimension value to identify a most similar focus topic value to the base focus topic value;
  the dimension value at the most similar focus topic value being a selected dimension value; and
  selecting at least one data value from the first data set at the difference dimension value from the selected dimension value as the predicted data value at the predicted dimension value.

28. The method of claim 27 further comprising:
  analyzing a second data set using a latent variable method using at least one focus topic; and
  the focus topic profile comprises at least one focus topic value of the at least one focus topic from the second data set.

29. The method of claim 27 wherein the first data set comprises financial data related to the focus topic profile over a dimension including at least the selected dimension value.

30. The method of claim 27 wherein the wherein the focus topic profile comprises a focus topic profile of news data related to the first data set over a dimension including at least the selected dimension value.

31. The method of claim 27 wherein the focus topic profile comprises a valence topic profile.

* * * * *